(12) United States Patent
Fowler et al.

(10) Patent No.: US 12,340,350 B2
(45) Date of Patent: Jun. 24, 2025

(54) INTERACTIVE AND DYNAMIC DIGITAL EVENT PROGRAM

(71) Applicant: Digital Seat Media, Inc., Fort Worth, TX (US)

(72) Inventors: Cameron Fowler, Fort Worth, TX (US); Matthew Sullivan, Austin, TX (US)

(73) Assignee: Digital Seat Media, Inc., Fort Worth, TX (US)

( * ) Notice: Subject to any disclaimer, the term of this patent is extended or adjusted under 35 U.S.C. 154(b) by 0 days.

(21) Appl. No.: 18/481,754

(22) Filed: Oct. 5, 2023

(65) Prior Publication Data

US 2024/0086851 A1  Mar. 14, 2024

Related U.S. Application Data

(63) Continuation of application No. 17/938,395, filed on Oct. 6, 2022, now Pat. No. 11,816,597, which is a
(Continued)

(51) Int. Cl.
*G06Q 50/12* (2012.01)
*G06F 16/23* (2019.01)
(Continued)

(52) U.S. Cl.
CPC .......... *G06Q 10/105* (2013.01); *G06F 16/23* (2019.01); *G06K 7/10297* (2013.01);
(Continued)

(58) Field of Classification Search
None
See application file for complete search history.

(56) References Cited

U.S. PATENT DOCUMENTS

| | | |
|---|---|---|
| 6,144,304 A | 11/2000 | Webb |
| 6,658,348 B2 | 12/2003 | Rudd et al. |

(Continued)

FOREIGN PATENT DOCUMENTS

| | | |
|---|---|---|
| EP | 2254083 A1 | 11/2010 |
| EP | 2988260 A1 | 2/2016 |

(Continued)

OTHER PUBLICATIONS

International Search Report issued in International Application No. PCT/US2021/071461 dated Feb. 10, 2022.
(Continued)

*Primary Examiner* — Carl Adams
(74) *Attorney, Agent, or Firm* — Vos-IP, LLC

(57) ABSTRACT

A method for distributing an interactive digital event program to a plurality of user devices comprising: receiving a request for an interactive digital event program from a first user device, the request received in response to scanning a first tag having a machine-readable code with the first user device; determining that the first tag belongs to a first group of tags to which a first version of the interactive digital event program is to be distributed; providing the first user device with the first version of the interactive digital event program, the first version of the interactive digital event program to include at least one dynamic content element that is capable of being updated while an event is in progress; and updating the at least one dynamic content element in the first version of the interactive digital event program in response to a predefined trigger.

32 Claims, 7 Drawing Sheets

Related U.S. Application Data continuation of application No. 17/660,823, filed on Apr. 26, 2022, now Pat. No. 11,494,737, which is a continuation of application No. 17/446,298, filed on Aug. 29, 2021, now Pat. No. 11,475,409, which is a continuation-in-part of application No. 17/302,233, filed on Apr. 27, 2021, now Pat. No. 11,106,753.

(60) Provisional application No. 63/201,373, filed on Apr. 27, 2021, provisional application No. 63/201,376, filed on Apr. 27, 2021, provisional application No. 63/269,015, filed on Mar. 8, 2022, provisional application No. 63/015,688, filed on Apr. 27, 2020.

(51) Int. Cl.
    G06K 7/10     (2006.01)
    G06K 7/14     (2006.01)
    G06Q 10/105   (2023.01)
    H04L 9/40     (2022.01)

(52) U.S. Cl.
    CPC ....... *G06K 7/10366* (2013.01); *G06K 7/1417* (2013.01); *H04L 63/08* (2013.01)

(56) References Cited

U.S. PATENT DOCUMENTS

| | | | |
|---|---|---|---|
| 7,379,886 | B1 | 5/2008 | Zaring et al. |
| 7,587,214 | B2 | 9/2009 | Inselberg |
| 7,817,990 | B2 | 10/2010 | Pamminger et al. |
| 8,056,802 | B2 | 11/2011 | Gressel et al. |
| 8,494,838 | B2 | 7/2013 | Donabedian et al. |
| 8,731,583 | B2 | 5/2014 | Wengrovitz |
| 8,971,861 | B2 | 3/2015 | Gupta et al. |
| 9,002,727 | B2 | 4/2015 | Horowitz et al. |
| 9,117,231 | B2 | 8/2015 | Rodgers et al. |
| 9,201,470 | B2 | 12/2015 | Kim et al. |
| 9,223,750 | B2 | 12/2015 | Liu et al. |
| 9,223,885 | B2 | 12/2015 | Marsico |
| 9,324,079 | B2 | 4/2016 | Moulin et al. |
| 9,405,844 | B2 | 8/2016 | Lim et al. |
| 9,451,389 | B2 | 9/2016 | Beg et al. |
| 9,616,338 | B1 | 4/2017 | Hooper et al. |
| 9,681,302 | B2 | 6/2017 | Robinton et al. |
| 9,767,645 | B1 | 9/2017 | Cronin et al. |
| 9,826,049 | B2 | 11/2017 | Lim et al. |
| 9,870,585 | B2 | 1/2018 | Cronin et al. |
| 9,883,344 | B2 | 1/2018 | Bolton et al. |
| 9,965,819 | B1 | 5/2018 | Devries |
| 9,977,865 | B1 | 5/2018 | Laborde |
| 10,009,429 | B2 | 6/2018 | Manchado |
| 10,127,746 | B2 | 11/2018 | Bergdale et al. |
| 10,163,124 | B2 | 12/2018 | Horowitz et al. |
| 10,178,166 | B2 | 1/2019 | Sharan |
| 10,248,905 | B1 | 4/2019 | Beatty |
| 10,594,774 | B2 | 3/2020 | Thomas |
| 10,942,913 | B1 | 3/2021 | Khoyilar et al. |
| 11,074,543 | B1 | 7/2021 | Rudeegraap et al. |
| 11,461,425 | B2 | 10/2022 | Fowler et al. |
| 11,468,138 | B2 | 10/2022 | Fowler et al. |
| 11,838,587 | B1 | 12/2023 | Ensing |
| 2001/0050310 | A1 | 12/2001 | Rathus et al. |
| 2002/0016816 | A1 | 2/2002 | Rhoads |
| 2003/0008661 | A1 | 1/2003 | Joyce et al. |
| 2003/0041155 | A1 | 2/2003 | Nelson et al. |
| 2003/0069827 | A1 | 4/2003 | Gathman et al. |
| 2006/0077253 | A1 | 4/2006 | Vanriper et al. |
| 2006/0094409 | A1 | 5/2006 | Inselberg |
| 2007/0209264 | A1 | 9/2007 | Lau |
| 2007/0229217 | A1 | 10/2007 | Chen et al. |
| 2009/0085724 | A1 | 4/2009 | Naressi et al. |
| 2009/0112683 | A1 | 4/2009 | Hamilton, II et al. |
| 2009/0138920 | A1 | 5/2009 | Anandpura et al. |
| 2009/0189982 | A1 | 7/2009 | Tawiah |
| 2009/0222336 | A1 | 9/2009 | Etheridge, Jr. et al. |
| 2010/0077429 | A1 | 3/2010 | Kim et al. |
| 2010/0133339 | A1 | 6/2010 | Gibson et al. |
| 2010/0184462 | A1 | 7/2010 | Lapstun et al. |
| 2010/0228577 | A1 | 9/2010 | Cunningham et al. |
| 2010/0245083 | A1 | 9/2010 | Lewis |
| 2010/0279710 | A1 | 11/2010 | Dicke et al. |
| 2011/0034252 | A1 | 2/2011 | Morrison et al. |
| 2011/0270618 | A1 | 11/2011 | Banerjee et al. |
| 2012/0011015 | A1 | 1/2012 | Singh et al. |
| 2012/0130770 | A1 | 5/2012 | Heffernan |
| 2012/0162436 | A1 | 6/2012 | Cordell et al. |
| 2012/0233237 | A1 | 9/2012 | Roa et al. |
| 2012/0265696 | A1 | 10/2012 | Tuchman et al. |
| 2012/0280784 | A1 | 11/2012 | Gaviria Velez et al. |
| 2013/0024371 | A1* | 1/2013 | Hariramani ......... G06Q 20/384 705/41 |
| 2013/0043302 | A1 | 2/2013 | Powlen et al. |
| 2013/0073366 | A1 | 3/2013 | Heath |
| 2013/0080218 | A1 | 3/2013 | Wildern, IV et al. |
| 2013/0085834 | A1 | 4/2013 | Witherspoon, Jr. et al. |
| 2013/0159026 | A1 | 6/2013 | Rogel et al. |
| 2013/0166384 | A1 | 6/2013 | Das |
| 2013/0191229 | A1* | 7/2013 | Rodgers ................ G06Q 30/06 705/15 |
| 2013/0218721 | A1 | 8/2013 | Borhan et al. |
| 2013/0275221 | A1 | 10/2013 | Zeto, III et al. |
| 2013/0297430 | A1 | 11/2013 | Soergel |
| 2013/0311214 | A1 | 11/2013 | Marti et al. |
| 2014/0039945 | A1 | 2/2014 | Coady et al. |
| 2014/0046802 | A1 | 2/2014 | Hosein et al. |
| 2014/0058886 | A1 | 2/2014 | Gopalakrishnan et al. |
| 2014/0156752 | A1 | 6/2014 | Fetyko |
| 2014/0217164 | A1 | 8/2014 | Sweeney et al. |
| 2014/0278592 | A1 | 9/2014 | Giampapa |
| 2014/0279072 | A1 | 9/2014 | Serino |
| 2014/0282684 | A1 | 9/2014 | Keen et al. |
| 2014/0365574 | A1 | 12/2014 | Franks et al. |
| 2015/0012307 | A1 | 1/2015 | Moss |
| 2015/0067811 | A1 | 3/2015 | Agnew et al. |
| 2015/0073879 | A1 | 3/2015 | Acosta-Cazaubon |
| 2015/0081532 | A1 | 3/2015 | Lewis et al. |
| 2015/0088658 | A1 | 3/2015 | Iiduka et al. |
| 2015/0112704 | A1 | 4/2015 | Braun |
| 2015/0120388 | A1 | 4/2015 | Tan et al. |
| 2015/0149307 | A1* | 5/2015 | Thukral ................. H04W 4/80 705/15 |
| 2015/0161684 | A1 | 6/2015 | Raikula |
| 2015/0199618 | A1 | 7/2015 | Khan |
| 2015/0279164 | A1 | 10/2015 | Miller et al. |
| 2015/0294392 | A1 | 10/2015 | Sharon et al. |
| 2015/0296347 | A1 | 10/2015 | Roth et al. |
| 2015/0304601 | A1 | 10/2015 | Hicks et al. |
| 2015/0348329 | A1 | 12/2015 | Carre et al. |
| 2015/0358794 | A1 | 12/2015 | Nokhoudian et al. |
| 2015/0379791 | A1 | 12/2015 | Russell et al. |
| 2016/0086228 | A1 | 3/2016 | Babb et al. |
| 2016/0104041 | A1 | 4/2016 | Bowers et al. |
| 2016/0104347 | A1 | 4/2016 | Yang |
| 2016/0132925 | A1 | 5/2016 | Durst, Jr. et al. |
| 2016/0189287 | A1 | 6/2016 | Van Meter |
| 2016/0191821 | A1 | 6/2016 | Dwarakanath et al. |
| 2016/0217258 | A1 | 7/2016 | Pitroda et al. |
| 2016/0260319 | A1 | 9/2016 | Jeffery et al. |
| 2016/0282619 | A1 | 9/2016 | Oto et al. |
| 2016/0307379 | A1 | 10/2016 | Moore, Jr. et al. |
| 2016/0335565 | A1 | 11/2016 | Charriere et al. |
| 2016/0381023 | A1 | 12/2016 | Dulce et al. |
| 2017/0039599 | A1 | 2/2017 | Tunnell et al. |
| 2017/0142460 | A1 | 5/2017 | Yang et al. |
| 2017/0250006 | A1 | 8/2017 | Ovalle |
| 2017/0308692 | A1 | 10/2017 | Yano |
| 2017/0330263 | A1 | 11/2017 | Shaffer |
| 2017/0337531 | A1 | 11/2017 | Kohli |
| 2018/0025402 | A1 | 1/2018 | Morris |
| 2018/0026954 | A1 | 1/2018 | Toepke et al. |
| 2018/0075717 | A1 | 3/2018 | Reinbold et al. |
| 2018/0089775 | A1 | 3/2018 | Frey et al. |
| 2018/0276705 | A1 | 9/2018 | Jay et al. |

(56) References Cited

U.S. PATENT DOCUMENTS

| | | |
|---|---|---|
| 2018/0288394 A1 | 10/2018 | Aizawa |
| 2018/0330327 A1 | 11/2018 | Hertenstein et al. |
| 2018/0336286 A1 | 11/2018 | Shah |
| 2018/0353999 A1 | 12/2018 | McGillicuddy et al. |
| 2018/0376217 A1 | 12/2018 | Kahng et al. |
| 2019/0066063 A1 | 2/2019 | Jessamine |
| 2019/0098504 A1 | 3/2019 | Van Betsbrugge et al. |
| 2019/0130450 A1 | 5/2019 | Lamont |
| 2019/0220715 A1 | 7/2019 | Park et al. |
| 2019/0311341 A1 | 10/2019 | Rice |
| 2019/0362601 A1 | 11/2019 | Kline et al. |
| 2019/0385128 A1 | 12/2019 | Cummings |
| 2020/0035019 A1 | 1/2020 | Cappello et al. |
| 2020/0066129 A1 | 2/2020 | Galvez et al. |
| 2020/0104601 A1 | 4/2020 | Karoui et al. |
| 2020/0184547 A1 | 6/2020 | Andon et al. |
| 2020/0213006 A1 | 7/2020 | Graham et al. |
| 2020/0236278 A1 | 7/2020 | Yeung et al. |
| 2020/0320911 A1 | 10/2020 | Bruce |
| 2020/0327997 A1 | 10/2020 | Behrens et al. |
| 2020/0413152 A1 | 12/2020 | Todorovic et al. |
| 2021/0019564 A1 | 1/2021 | Zhou et al. |
| 2021/0019715 A1 | 1/2021 | Stier et al. |
| 2021/0027402 A1 | 1/2021 | Davis et al. |
| 2021/0065256 A1 | 3/2021 | Shontz |
| 2021/0118085 A1 | 4/2021 | Bushnell et al. |
| 2021/0134248 A1 | 5/2021 | Wan et al. |
| 2021/0174344 A1 | 6/2021 | Fowler et al. |
| 2021/0247947 A1 | 8/2021 | Jaynes et al. |
| 2021/0248338 A1 | 8/2021 | Spivack et al. |
| 2021/0390509 A1 | 12/2021 | Fowler et al. |
| 2022/0060759 A1 | 2/2022 | Fowler et al. |
| 2022/0103885 A1 | 3/2022 | Sarosi et al. |
| 2022/0114228 A1 | 4/2022 | Fowler et al. |
| 2022/0116737 A1 | 4/2022 | White et al. |
| 2022/0167021 A1 | 5/2022 | French et al. |
| 2022/0172128 A1 | 6/2022 | Lore |
| 2022/0188839 A1 | 6/2022 | Andon et al. |
| 2022/0248169 A1 | 8/2022 | Bettua et al. |
| 2022/0337898 A1 | 10/2022 | Dorogusker et al. |
| 2022/0343451 A1 | 10/2022 | Fowler et al. |
| 2023/0117466 A1 | 4/2023 | Idris et al. |
| 2023/0239446 A1* | 7/2023 | Cvijanovic .......... H04N 13/194 348/47 |

FOREIGN PATENT DOCUMENTS

| | | |
|---|---|---|
| EP | 3550844 A1 | 10/2019 |
| FR | 3092195 A1 | 7/2020 |
| KR | 10-2015-0042885 A | 4/2015 |
| WO | WO/2006/011557 A1 | 2/2006 |
| WO | WO/2008/124168 A1 | 10/2008 |
| WO | WO/2013/120064 A1 | 8/2013 |
| WO | WO/2014/081584 A1 | 5/2014 |
| WO | WO/2014/112686 A1 | 7/2014 |
| WO | WO/2015/035055 A1 | 3/2015 |
| WO | WO/2016/041018 A1 | 3/2016 |
| WO | WO/2019/016602 A2 | 1/2019 |

OTHER PUBLICATIONS

International Search Report issued in International Application No. PCT/US2022/071913 dated Jun. 15, 2022.
International Search Report issued in International Application No. PCT/US2021/070248 dated May 18, 2021.
International Search Report issued in International Application No. PCT/US2021/070471 dated Jun. 28, 2021.
International Search Report issued in International Application No. PCT/US2022/071909 dated Aug. 3, 2022.
International Search Report issued in International Application No. PCT/US2022/071912 dated Jul. 6, 2022.
International Search Report issued in International Application No. PCT/US2022/071938 dated Jul. 6, 2022.
International Search Report issued in International Application No. PCT/US2022/071906 dated Jul. 7, 2022.
International Search Report issued in International Application No. PCT/US2022/071910 dated Jul. 7, 2022.
International Search Report issued in International Application No. PCT/US2022/071908 dated Aug. 8, 2022.
International Search Report issued in International Application No. PCT/US2022/071915 dated Jul. 8, 2022.
"Blockchain", Wikipedia, Sep. 27, 2019.
"QR Codes: Here They Come, Ready or Not", Printing Tips: Precision Printing Newsletter, vol. 1, No. 1, May 2011.
"URL Redirection", Wikipedia, Mar. 21, 2021.
"Web Template System", Wikipedia, Mar. 2, 2021.
Garg, "QR Codes in Sporting Goods Companies: Eight Use Cases Across the Industry", Scanova Blog, Dec. 11, 2019, https://scanova.io/blog/qr-codes-sporting-goods-companies/.
McLaren, "Women's Beach Volleyballers Sign Deal to Display QR Code on Their Rears!", Digital Sport, Aug. 9, 2011, https://digitalsport.co/women%E2%80%99s-beach-volleyballers-sign-deal-to-display-qr-code-on-their-rears.
Unruh, "OU's Sooner Schooner Will Run on Field as Football Gameday Traditions Remain in New Ways: 'We Feel Like We Can Safely Do That'", The Oklahoman, Sep. 10, 2020, https://www.oklahoman.com/story/sports/columns/2020/09/10/sooner-schooner-will-run-field-football-gameday-traditions-remain-new-.
Muthukumar, et al., "QR Code and Biometric Based Authentication System for Trains", IOP Conference Series: Materials Science and Engineering, vol. 590, art. 012010, 2019, 1-7.

* cited by examiner

INTERACTIVE AND DYNAMIC DIGITAL EVENT PROGRAM

CROSS-REFERENCE TO RELATED APPLICATIONS

This application is a continuation of U.S. patent application Ser. No. 17/938,395 filed Oct. 6, 2022, which is a continuation of U.S. patent application Ser. No. 17/660,823 filed on Apr. 26, 2022, which claims the benefit of U.S. Provisional Patent Application No. 63/201,376 filed on Apr. 27, 2021, U.S. Provisional Patent Application No. 63/201,373 filed on Apr. 27, 2021, U.S. Provisional Patent Application No. 63/269,015 filed on Mar. 8, 2022, and U.S. patent application Ser. No. 17/446,298 filed on Aug. 29, 2021, which is a continuation-in-part of U.S. patent application Ser. No. 17/302,233 filed on Apr. 27, 2021, which claims the benefit of U.S. Provisional Patent Application No. 63/015,688 filed on Apr. 27, 2020, all with the United States Patent and Trademark Office, the contents of which are incorporated herein by reference in their entirety.

FIELD OF THE INVENTION

The present invention relates generally to using a machine-readable code to access an interactive digital program such as program for an event. The present invention also relates generally to methods and systems that enable electronic delivery of interactive digital event programs to devices in response to using the devices to read/scan machine-readable codes and to dynamically update the digital event program during the course of the event.

BACKGROUND OF THE INVENTION

Traditionally, events, whether large or small, typically provide some sort of outline or program to accompany the event. The program can be as simple as words on a chalkboard for a simple service or as elaborate as a "souvenir program" for a big production. Commonly, even today, event programs are printed on paper and handed to attendees. Many printed event programs end up on the floor or in the trash despite attempts to collect them for recycling.

With the advent of the digital age, some venues, event, and other such providers use digital programs as an alternative to paper programs. Many of these digital programs are simply electronic versions of paper programs in a portable document format (PDF) or similar digital format. Thus, even though digital, they may not translate to an enjoyable digital user experience and the content therein is largely pre-embedded before publishing, which may be outdated before the event even takes place. Furthermore, with these types of event programs, coupons or other sponsor offers have to be downloaded and/or printed before use, which may reduce the appeal for sponsors to advertise in these types of digital publications, which, in turn, may reduce a source of revenue to offset the cost of creating/maintaining the event program. Modern consumers have higher expectations than what is currently offered in the way of event programs including digital event programs.

Thus, there is a need for elevated ways to provide information to people interested in an event. The systems and methods described herein detail elegant solutions for providing relevant information and interactions relating to an event dynamically, as the user is experiencing the event. Generally, tags including machine-readable codes are utilized to provide users with interactive and dynamically updated digital event programs.

SUMMARY OF THE INVENTION

In a preferred embodiment, a method for distributing different versions of an interactive digital event program corresponding to an event to a plurality of user devices comprising: (a) receiving a request for an interactive digital event program from a first user device, the request received in response to scanning a first tag having a machine-readable code with the first user device; (b) determining that the first tag belongs to a first group of tags to which a first version of the interactive digital event program is to be distributed; (c) providing the first user device with the first version of the interactive digital event program, the first version of the interactive digital event program to include at least one dynamic content element that is capable of being updated through a third party integration while the event is in progress; and (d) updating the at least one dynamic content element in the first version of the interactive digital event program in response to detecting an occurrence of a predefined trigger.

In a further embodiment, the method wherein updating the at least one dynamic content element includes updating dynamic content selected from the group consisting of: a map, a video replay, augmented reality, live action video, a fan camera, a fan filter, live statistics, a non-fungible token, wagering, an audience participation activity, upcoming events, merchandise, concessions, a digital offer, and a ticket.

In a further embodiment, the method wherein updating the at least one dynamic content element includes unlocking the digital offer in response to detecting the use of an in-venue map.

In a further embodiment, the method wherein updating the at least one dynamic content element includes disposing icons on the in-venue map corresponding to locations of one or more additional tags that are distributed within a venue in which the event is taking place. In a further embodiment, the method further comprising facilitating a scavenger hunt within the venue utilizing the one or more additional tags.

In a further embodiment, the method wherein updating the at least one dynamic content element includes updating the dynamic content element to include a digital offer, the digital offer to be automatically downloaded to a digital wallet on the first user device.

In a further embodiment, the method wherein updating the at least one dynamic content element includes updating the dynamic content element to include streamed live action video taking place at the event. In a further embodiment, the method wherein updating the at least one dynamic content element includes updating the dynamic content element to include a video replay of action that took place during the event. In a further embodiment, the method or 8 further comprising overlaying, embedding, or both of an augmented reality object on the video.

In a further embodiment, the method further comprising linking the at least one dynamic content element to a third party integration for a digital offer after the event has started.

In a further embodiment, the method further comprising dynamically moving the at least one dynamic content element within the first version of the interactive digital event program while the event is taking place to maximize exposure of the at least one dynamic content element to a plurality of users.

In a further embodiment, the method wherein the at least one dynamic content element includes a digital offer and syncing the digital offer to advertising shown on a jumbo screen, a televised broadcast of the event, or both.

In a further embodiment, the method wherein the at least one dynamic content element includes statistical information, updating the statistical information in real time as the event is taking place, and inserting a dynamic image element proximate the statistical information to dynamically display an image corresponding to the statistical information.

In a further embodiment, the method wherein updating the at least one dynamic content element includes updating the at least one dynamic content element to include an offer for a non-fungible token of the first version of the interactive digital event program.

In a further embodiment, the method wherein the at least one dynamic content element is a listing of upcoming events comprising including customizing the listing of upcoming events based on a tag scanning history associated with the first user device, a primary geographical position associated with the first user device, a current geographical position associated with the first user device, or combinations thereof.

In a further embodiment, the method wherein updating dynamic content includes updating the digital offer based on current levels of inventory available at the event. In a further embodiment, the method wherein updating dynamic content includes updating the digital offer to customize the digital offer to appeal to a demographic associated the first group of tags.

In a further embodiment, the method further comprising updating the interactive digital event program after the event is over. In a further embodiment, the method further comprising continuing updating the first version of the interactive digital event program throughout a season of events to document the season of events.

In a further embodiment, the method further comprising basing the interactive digital event program on a template, the at least one dynamic content element dragged and dropped into a desired position within the template, and wherein the at least one dynamic content element can be modified by an administrator within the template. In a further embodiment, the method further including repositioning the at least one dynamic content element in the template while the event is taking place.

In a further embodiment, the method further comprising: (e) receiving a second request for an interactive digital program from a second user device, the second request received in response to scanning a second tag having a machine-readable code with the second user device; (f) determining that the second tag belongs to a second group to which a second version of the interactive digital event program is to be distributed; and (g) providing the second user device with the second version of the interactive digital event program, the second version to include a dynamic content element to be populated throughout the event using the third party integration.

In a further embodiment, the method wherein the first tag is at a venue in which the event is being held and the second tag is on or in a televised video stream.

In a preferred embodiment, a method of distributing different versions of an interactive digital event program for a particular event to user devices comprising: (a) designing a template for each of at least two versions of the interactive digital event program by dragging and dropping a plurality of dynamic content elements into each template to complete a desired layout; (b) associating each dynamic content element in the plurality with a distinct data source to dynamically update content within the dynamic content element while the particular event is in progress; (c) assigning each version of the at least two versions of the interactive digital event program to separate groups of tags, each tag in each separate group having a unique tag identifier; (d) in response to receiving a request for the interactive digital event program from the user device that has scanned a particular tag, determining to which group the particular tag belongs based on the unique tag identifier for the particular tag; (e) sending the version of the interactive digital event program assigned to the group of tags in which the particular tag belongs to the user device that sent the request; and (f) causing the distinct data sources to populate the associated dynamic content elements in the template for the sent version of the interactive digital event program, the content of least one of the associated dynamic content elements to be updated while the event is in progress and in response to a predefined trigger that has occurred in the event.

In a preferred embodiment, a system for providing an interactive digital event program comprising: (a) a plurality of tags, each tag in the plurality having a machine-readable code and a unique tag identifier; (b) a server having a computer processor and computer memory; (c) a database operatively connected to the server, the database including information relating to each tag in the plurality of tags, the information relating to each tag including: (i) the unique tag identifier; (ii) a group identifier to identify a group to which the tag belongs; and (iii) a template for an interactive digital event program to be distributed to the group in which the tag belongs; and (d) wherein the computer memory of the server stores executable code which when executed enables the server to perform a process comprising: (i) in response to receiving a request from a user device that has scanned a tag, using the unique tag identifier from the scanned tag to identify the group to which the scanned tag belongs; (ii) populating the template for the interactive digital event program to be distributed to the group in which the tag belongs with one or more dynamic content elements; (iii) sending the populated interactive digital event program to the user device that sent the request; and (iv) updating the content of at least one dynamic content element in response to detecting a predefined trigger based on activity within the event that optionally occurred during the event.

In a further embodiment, the system wherein updating the content of the at least one dynamic content element includes pushing updated content from a third party data source to the at least one dynamic content element in response to detecting the predefined trigger. In a further embodiment, the system wherein the predefined trigger is a pause in the activity and updating the content of at least one dynamic content element includes pushing updated content from the third party data source in response to detecting a pause in the activity.

In a further embodiment, the system wherein updating the content of at least one dynamic content element includes unlocking content in response to detecting the predefined trigger.

In a further embodiment, the system wherein the predefined trigger is a threshold number and dynamically updating includes detecting that the threshold number has been reached and unlocking the content in response to reaching the threshold number.

In a further embodiment, the system wherein the content of the at least one dynamic content element is subject matter associated with a non-fungible token (NFT) and updating the content of at least one dynamic content element in response to detecting a predefined trigger includes unlocking the subject matter in response to detecting the predefined trigger to enable acquisition of the NFT.

In a further embodiment, the system wherein the interactive digital event program continues to be updated after the event ends.

In a further embodiment, the system wherein the database stores a plurality of identifiable images and the server selects an identifiable image to display in association with the at least one dynamic content element.

In a further embodiment, the system wherein the at least one dynamic content element defines an augmented reality video.

In a further embodiment, the system wherein the machine-readable code is located within a video stream, wherein the unique tag identifier is utilized to determine which interactive digital event program to display to said user device.

In a further embodiment, the system further comprising a geolocation determination wherein a location of the user device is defined within a rule within a tag group to alter the interactive digital event program directed to said user device.

In a further embodiment, the system wherein a venue is selected from the group consisting of: a school, a cultural event location, a zoo, a music venue, and combinations thereof.

In a further embodiment, the system wherein the dynamic content element is connected to a third party API and wherein the third party API disseminates the dynamic content element upon the occurrence of a trigger.

In a further embodiment, the system wherein the tag grouping defines a version of the interactive digital event program that is displayed to said user device.

In a further embodiment, the system further comprising wherein a camera defined on the user device captures video, wherein the captured video is uploaded into the interactive digital event program and the captured video is released as the dynamic content element.

In a further embodiment, the system further comprising wherein the dynamic content element displays a portion of video, said portion of video being a replay, a highlight, or augmented reality.

In a further embodiment, the system wherein the dynamic content element is an advertisement.

In a further embodiment, the system wherein the user device comprises a unique ID wherein the unique ID defines an entry within a database and wherein the entry comprises information regarding actions of the unique ID; aggregating the data regarding the unique ID from said database; and creating a tag grouping based upon the aggregated data on the unique ID and modifying the dynamic content element on said interactive digital event program. In a further embodiment, the system wherein the system collects and aggregates analytical user data corresponding to said unique ID when said user device is interacting with the interactive digital event program.

In a further embodiment, the system wherein the dynamic content element is a real-time polling question and wherein a result from the real-time polling question is displayed. In a further embodiment, the system wherein the dynamic content element is related to fantasy sports or wagering.

In a further embodiment, the system wherein the tag grouping is defined within a section of a venue and wherein the tag grouping is awarded a prize which is pushed into the user device within the dynamic content element within the interactive digital event program.

DETAILED DESCRIPTION OF THE INVENTION

Figure 1:
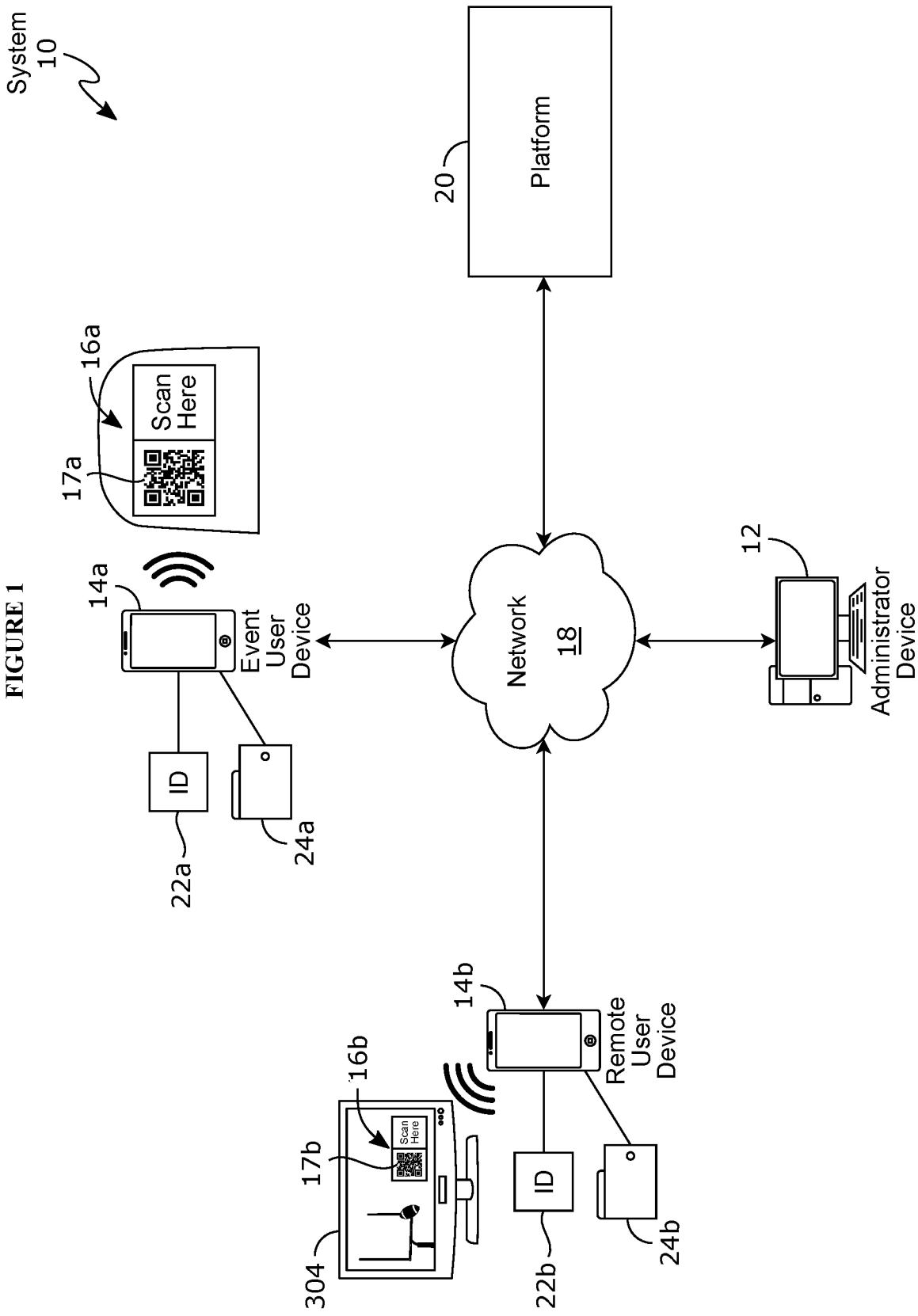
FIG. 1 depicts an embodiment of a system for user device generated interactions with a system and platform for accessing and viewing targets, such as a GUI for an interactive digital event program.

Various embodiments are described more fully hereinafter with reference to the accompanying drawings, which form a part hereof, and which show, by way of illustration, specific exemplary embodiments by which the innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, devices, or any similar or equivalent arrangements known to those skilled in the art. Accordingly, the various embodiments may take the form of an entirely hardware embodiment, an entirely software embodiment or an embodiment combining software and hardware aspects. The following detailed description is, therefore, not to be taken in a limiting sense.

As used in this application, the words "a," "an," and "one" are defined to include one or more of the referenced items unless specifically stated otherwise. The terms "approximately" and "about" are defined to mean ±10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

As used herein, the below terms will have the following meanings as may be supplemented elsewhere in this specification:

ADDRESS: Code used to direct a user device, browser, web app, progressive web app, administrator device, server, database, API, tool, software, etc., to a resource within the system or a network. Nonlimiting examples of addresses include a uniform resource identifier (URI) or a uniform resource locator (URL).

ADMINISTRATOR: The individual or group of individuals with the ability to control and set rules and parameters within the system. This could be a third party administrator, the proprietor, the venue, the owner of the tags, the team or performer participating in the event, a designated employee of any of the foregoing, etc.

ADMINISTRATOR DEVICE: Any type of mobile or non-mobile processing device such as a desktop computer, handheld computer (e.g., phone, smartphone, tablet, personal digital assistant), wearable computer (e.g., smart watch, smart glasses), portable computers (e.g., laptop, netbooks, Chromebook), or wearable or implantable device, and the like using wireless communication, a camera or other connectivity element that is accessible only to an administrator or proprietor or an employee designated by the administrator or proprietor.

ANALYTICS OR ANALYTICAL DATA: Data collected by the system or retrieved by the system via an API call to an external server or database. Nonlimiting examples of analytical data include date, time, GPS location, personal identifying information, etc.

APPLICATION PROGRAMMING INTERFACE ("API"): An application programing interface or programming code that enables data transmission within the system, between the system's server and an external server or between one software product and another. Nonlimiting examples of API connections to the system may be third party vendor databases such as ticketing sales platforms, e-commerce sites such as merchandise sales, social media sites, or any other third party software product that makes their API available for use by others.

API CALL: Computer code used by the system software to access data, server software or other applications within the system or external to the system, acting as an intermediary between any two devices or servers that want to connect with each other for a specified task. As used herein, API can mean (i) representational state transfer or Rest (RESTful) API; (ii) Simple Object Access Protocol ("SOAP") API; (iii) extensible markup language-Remote Procedure Calls ("XML-RPC"); (iv) JSON Remote Procedure Calls ("JSON-RPC), (v) open API; (vi) partner API; (viii) internal or private API; (ix) composite API; or (x) any other API that is generally known, or will be come to be known in the art. Thus, the system frequently uses an API, or sends an API request, to an internal or external program, server, or database to deliver requested information.

BLOCKCHAIN: Any digitally distributed, decentralized, public or private ledger that exists across a network such as those offered by the providers including but not limited to Ethereum, Binance Smart Chain, Polkadot, Flow by Dapper Labs, EOS, Tron, Tezos, WAX, Theta, etc.

BROWSER APPLICATION: An application that runs within the Web browser of a User Device or Computer. The instructions or executable code, typically written in a combination of HTML and JavaScript, is embedded within the Web page that is downloaded from a website.

COMPUTER: May be any type of computer such as a laptop computer, desktop computer, tablet, and the like, and includes the appropriate hardware, firmware, and software to enable the computer to function as intended.

CONTENT: Any type of information, images, videos, etc. Nonlimiting examples of content can be a video file, an image file, text, executable code, a digital offer, a digital coupon, a digital wallet offer, an AR, VR or mixed reality filter, a game, a poll, an app, an NFT, etc. Content can be specifically formatted for optimal viewing on a user device.

CRYPTO CURRENCY: Any digital currency in which transactions are verified and records maintained on a distributed ledger such as blockchain, for example, Bitcoin, Ethereum, Cardano, Binance Coin, Tether, Solana, XRP, Dogecoin, etc.

DATABASE MANAGEMENT SYSTEM: A software package designed to define, manipulate, retrieve, and manage data in a database, or any other generally accepted definition known to those skilled in the art.

DIGITAL OFFER: Any incentive or reward, for example an incentive to purchase at a discounted price or a free giveaway, offered by a proprietor and delivered to users from a server to a user device through a variety of channels. A Digital offer can be code stored in the user's digital wallet, an MRC displayed in web browser and presented to a proprietor for redemption, an e-mail with a unique redemption code, a text message, SMS/MMS, push notification or socket notification with a unique redemption code. Digital offers can be stored anywhere on a user device or can be downloaded or turned into physical offers by printing. Digital offers can be limited to a particular user, or a user may share the digital offer to other users. If a digital offer is shared, the same offer can be shared to multiple other users, or the digital offer can be modified by the system when it is shared. Digital offers can also be associated with a unique code that is stored in a database on a server internal or external to the system.

DIGITAL WALLET: A software-based system that securely stores users' information such as payment information, passwords, digital certificates, digital coupons, crypto currency, tokens, NFTs, digital ID such as a digital driver's license or passport, etc. A digital wallet can be a blockchain or crypto currency wallet. A digital wallet can be stored locally on any user device or can be cloud based and accessed by a user device. Digital wallet can also mean digital storage in general on any user device or computer. Digital wallet can also be referred to as a mobile wallet.

DISTRIBUTED DATABASE SYSTEM: Any database that consists of two or more files located in different sites either on the same network or on entirely different networks.

DISTRIBUTED LEDGER: Any database that is consensually shared and synchronized across multiple sites, institutions, or geographies, accessible by multiple people.

DATA SERVER OR SERVER: Any form of electronic device or plurality of devices having at least one computer processor, e.g., a central processing unit (CPU), and some form of computer memory having a capability to store data, as is well known in the art. The server may comprise hardware, software, and firmware for receiving, storing, and/or processing data as described below. The hardware may be in a single unit, or operably connected via a network. For example, a computer or server may comprise any of a wide range of digital electronic devices, including, but not limited to, a server, a desktop computer, a laptop, a smart phone, a tablet, a smart watch, smart glasses, a wearable device or an implantable device or any form of electronic device capable of functioning as described herein.

DYNAMIC ELEMENT: An element that is updated, altered, customized, etc., in response to a change in the status of a metric, trigger, or any other datapoint as determined by the system. A nonlimiting example of a dynamic element is the score of a game. If a goal is completed, then the score is updated to reflect this change.

EVENT: Nonlimiting examples of an event include a professional, amateur or intermural sporting events (i.e., football, baseball, hockey, basketball, soccer, rugby or cricket game, tennis or golf match, track and field or figure skating event or automobile race), a theatrical performance (play, musical or opera), a musical concert, elementary school, middle school, high school, college or university event, a service or ceremony (i.e., religious or worship), a tradeshow or conference, guided or self-guided tours (museums, galleries and historical site), time spent in a venue such as a visit to a zoo or amusement park, etc.

FAN PORTAL: A GUI, such as a homepage, displayed in the browser of a user device that provides links or access to other pages/modules via buttons or other means of selecting options from a menu of choices. The fan portal can also be used for viewing content and receiving digital offers.

INTERFACE SERVER: Within the system, a program, executable code, or API stored on a physical server, cloud storage system or in a serverless environment such as Amazon Web Services, which is capable of communicating with other servers, databases, and API's internal or external to the system. The interface server is able to make and receive calls, request and receive data, or execute other functions within systems. The interface server is also capable of running AI and/or utilizing machine learning.

GEOFENCE: A virtual perimeter for a real-world geographic area or an area in or around a venue.

GUI OR GRAPHICAL USER INTERFACE: A graphical interface to enable interactions between a user and the user's device, such as but not limited to an interface to the web app.

JUMBO SCREEN: Any display within a venue visible to users attending an event at a venue. The jumbo screen can be one display or multiple displays within the venue that can be controlled by the venue. Jumbo screen may also be known as a jumbotron.

LOCATION: An area whose perimeter or parameters are defined in an abstract way without boundaries that are clearly visible to users or proprietors. Nonlimiting examples of a location include a town, city, state, country, region, continent, time zone, or geofenced area.

MACHINE-READABLE CODE ("MRC"): A barcode, a quick response (QR) code, near-field communication (NFC) code, radio-frequency identification (RFID) code, universal product code (UPC), machine readable graphics (e.g., having a pattern, matrix, or the like) coding, instructions coded on a chip, or combinations thereof. A MRC may be may be included into (i) a tag that is mounted to a surface, (ii) identification badges such as, for example, student identification badges, employment identification badges, concert badges, and the like, (iii) merchandise such as t-shirts, sweatshirts, hats, mugs, glasses, posters, CD's, and the like, (iv) a piece of paper, cardstock, or plastic that is handed to users, (v) a video stream viewed over the internet or network television channel, (vi) an LCD/LED/e ink display device embedded, attached or affixed to a surface.

MANIFEST: A file containing metadata for a group of accompanying files that are part of the system that instruct the user device how to handle the system when it is started.

MINTING: Uniquely publishing a token on the blockchain to make it purchasable, saleable, or tradeable.

NON-FUNGIBLE TOKEN ("NFT"): A non-interchangeable unit of data stored on a digital ledger, such as but not limited to blockchain, that can be purchased, sold, auctioned, and traded. As used herein, NFT includes the contract and subject matter associated with the NFT and can also mean semi-fungible token or fractional NFT. Nonlimiting examples of the smart contracts that could govern a NFT include (i) 1/1 NFTs—known as ERC-721 tokens on Ethereum and Polygon, KIP17 on the Klatyn blockchain; (ii) Semi-fungible NFTs—known as ERC-1155 tokens on Ethereum and Polygon, KIP37 on Klatyn.

NFT MARKETPLACE: A platform where NFTs can be stored, displayed, bought, sold, traded, auctioned and in some cases minted.

PROPRIETOR: Any person or entity who purchases, subscribes to, or otherwise uses the system and/or platform and who is not a user. A Proprietor may or may not have administrative privileges to the system. Nonlimiting examples of proprietors include, venue owners, event promotors, teams, performers, theatre troupes, religious organizations, educational institutions (i.e., elementary school, middle school, high school, college, university), restaurants, bars, retail establishments, amusement parks, museums, art galleries, advertisers, media outlets (i.e., network television, cable television, radio, internet broadcasts), hospitals and health care systems, ticketing platforms, airlines, ride share services, etc.

PROPRIETOR PORTAL: An access point for a proprietor to enter the system and/or platform typically displayed in a browser.

RECORD: Information that is stored in an electronic or other intangible medium without limitations on how the data is structured.

REDIRECT/IDENTIFICATION SERVER: The server within the system that makes a determination on if a user and/or user device that has entered the system is unique, by locating the manifest stored on a user device and if a manifest exists, associating the unique ID stored in the manifest on the user device with the database of known unique ID's stored on the redirect/identification server, or for confirming other data based on one or more requests to the redirect/identification server.

REDIRECT URL: An address generated by a server, such as the redirect/identification server or the interface server, in response to an incoming request that points the browser on a user device to a different target.

RESOURCE RECORD: A database record associated with a tag ID.

REQUEST: A message sent by one device to another (e.g., phone to server, server to server, computer to server, server to database, etc.) using an address to send the request. For example, upon selecting from the options available in the Web browser, the selection is coded into a request that the Web browser sends to the server via an address. The request typically provides instructions to the server. Nonlimiting examples of a request can be Get, Post, Put, Delete, Connect, Options.

RULE: A set of conditional statements that tells the system how to react to a particular situation. Rules can be preprogramed into the system or can be set or changed by an administrator or proprietor.

SYSTEM: The network, tags, platform, etc.

TAG: A physical (e.g., tangible) form, a digital (e.g., virtual/intangible) form, or may be combinations of both forms that contains an MRC. Physical versions of tags may be constructed from diverse types of materials. The MRC may be printed, etched, or fabricated onto the tag materials such as paper, glass, plastic, metal, fabric, and the like as a few nonlimiting examples. In the case of tags that contain MRC's that are NFC or RFID, the tags may be adhered to, attached to, embedded in, or fabricated on (or combinations thereof) a natural or manmade material such as metal (e.g., aluminum, stainless steel), wood, polymer (e.g., plastic), film, glass, and combinations thereof. The material may then be incorporated into or affixed (e.g., adhesive or other form of attachment) to an object or location. A tag may be printed on a single or multiple use badge or ticket. Digital tags may include LED/LCD screens or a designated location within a video stream in which the MRC is located.

TAG ID: A unique identifier for the MRC affixed to the tag. The unique identifier can be any combination of letters, numbers, and symbols. The tag ID is stored in a database on a server and is coded with information specific to the location of the tag. For example, the tag ID might generally identify the geographic location of the tag (i.e., the United States, Pennsylvania and/or Philadelphia), the general venue location of the tag (i.e., Fenway Park, Madison Square Garden, Carnegie Hall, The Natural History Museum), the specific location of the tag within the venue (i.e., Section A, Row 1, Seat 10, next to Van Gogh's "Starry Night"), or any combination of information.

TAG URL: A unique address assigned to the MRC on each tag that may optionally include the tag ID.

TARGET: A Web page, file, address, GUI, web app, progressive web app, portal, content, or digital offer delivered to a user device. Those skilled in the art may also refer to a target as an endpoint.

TARGET DETERMINATION PROCESS: The process described in FIG. 5.

TARGET ID: A unique identifier for the Target. The unique identifier can be any combination of letters, numbers and/or symbols that can be stored in a database, on a server, and/or both. The target ID allows the platform to distinguish one target from another.

TICKETING PLATFORM: Both the primary ticketing platform and the secondary ticketing platform.

TRIGGER: The magnitude or condition that must be reached for a certain result to materialize. Triggers can be determined either by the system, an administrator, or a proprietor. Nonlimiting examples of a trigger can be the start or end of an event, something of significance that occurs during the event (i.e., the tenth goal scored, the first encore by a musical act), a single user completing a certain task, or n number of users completing a task.

TOKEN: A digital asset that is stored securely on the blockchain, representing a tradeable asset.

TOOLS: Cookies, pixels, widgets, plug-ins, etc.

UNIQUE ID: A unique identifier for the user device. The unique identifier can be any combination of letters, numbers and/or symbols, cookies, digital credentials, or it can be a digital certificate such as TLS, SSL, code signing certificate, client certificate, etc. . . . . The unique ID can be stored on the user device in any location on the user device such as the manifest, local storage, or digital wallet, in a database on a server, and/or both, and is used to associate the user device with the unique user record stored in a database on a server in the system.

UNIQUE IDENTIFYING INFORMATION: Personal information and demographics collected about a particular user's such as name, address, phone number, e-mail address, credit card information, gender, marital status, academic affiliation (student, faculty, alumni), driver's license number, age, username, password, pin number, social security number, bank account number, salary, etc.

USER DEVICE: Any type of mobile processing device such as a handheld computer (e.g., phone, smartphone, tablet, personal digital assistant), wearable computer (e.g., smart watch, smart glasses), portable computers (e.g., laptop, netbooks, Chromebook), or wearable or implantable device, and the like using wireless communication, a camera or other connectivity element.

USER DEVICE RECORD: A record stored within a database on a server that contains the unique ID and unique identifying information associated with that unique ID for each user that accesses the system. The user device record can contain an unlimited amount of information about the user device and presumably the user who owns the user device such as, but not limited to a history of events attended, digital offers used, gambling wagers made, NFTs minted or purchased, venues or locations visited, concession or merchandise purchases, donations made, incident reports, tags scanned, other actions taken, etc.

VENUE: Any physical location with defined perimeters and parameters such as a stadium, arena, court, track, concert hall, theatre, course, museum, restaurant, place of worship (church, synagogue, temple, mosque, etc.), historical site, cultural site, amusement park, zoo, aquarium, conference center or any other place where events are held, or users gather. Venues can also be hotel rooms, cruise ships, trains, airplanes, schools (elementary, middle, or high school) or a college campus or dorm.

WEB APP: Executable code that is stored on a remote server and delivered via the system or a network to a browser interface on a user device. The web app may facilitate communication between the user device and one or more servers such as the redirect/identification server or the interface server.

When people attend an event, they look to the program to give them information about the event. For example, a program for a service (e.g., memorial service) or ceremony (e.g., graduation) may list an order for the service or ceremony, provide details relating to speakers or the topic about which they are speaking, and other information as is typical for the occasion. Similarly, a program for a cultural event/artistic performance, such as a ballet, typically lists the acts and the story being told during the act, has dancer bios and maybe photos, lists the names of conductor and orchestra members by instrument, lists patrons and the level of patronage, among other information. And of course, a program for a sporting event, such as a football game, can be quite extensive especially if it is a "souvenir program," having full color photographs and descriptive information relating to players, a map of the stadium, a list of upcoming games and/or events to be held at the stadium, and an abundance of advertising. Thus, event programs can vary dramatically in size, formatting, information included, etc., depending on the event and/or venue. Nevertheless, event programs are typically all the same for a given event (unless, for example, a souvenir option is available) and only provide a static one-way communique from a proprietor (e.g., owner/organizer of a company, team, venue, event, etc.,) and advertisers to event attendees.

Embodiments of the present invention, however, expand the interaction between proprietors and users (e.g., those who are interested in the event, venue, and the like) via an interactive and dynamic event program (DEP). For example, event users (e.g., at the event/venue) and remote users (e.g., not at the event/venue) may both access an interactive DEP over a network such as the Internet, but the interactive DEP accessed by event users and remote users are not necessarily the same. In fact, they are most likely different. As one nonlimiting example, an interactive DEP accessed by an event user may have a feature that enables ordering and paying for food from an in-venue concession, which may also deliver the food to the event user's seat. This feature is not helpful to a remote user; thus, the interactive DEP accessed by the remote user will not allow in-venue purchases. But the remote version of the interactive DEP may include a feature that enables ordering, paying for, and delivery of food from an establishment that delivers in the remote user's geographical location. Nevertheless, interactive DEP versions accessed by event users and remote users may have many common features. For example, certain interactive DEP features may include dynamic content such videos, images, graphics, data, and audio, to name a few examples, which may be captured/updated as the event progresses. Moments after being captured/updated, the dynamic content may be made available to both event users and remote users via respective interactive DEPs. As one nonlimiting example, moments after occurring live, a video replay may be available to both event users and remote users via respective interactive DEPs. Although replays may be shown at the venue and elsewhere, a replay via the interactive DEP may be controlled by the user. And there may be other features available in the interactive DEP to enhance the replay.

Due to the interactive and dynamic nature of embodiments of the present invention, users may make multiple and/or new impressions, which may, in turn, benefit proprietors, advertisers, and the like. Furthermore, users get the most up-to-date information as the users are enjoying the DEP and not static content that may be outdated by the time the user receives a traditional event program. And, since embodiments of the event program of the present invention are digital, paper is not wasted. Thus, users of the interactive dynamic event program may continue their journey and expand on their interaction with the event/venue by receiving new content as the event takes place. Furthermore, the dynamic nature of the event program enables advertisers/sponsors to seek opportunities that they may not otherwise enjoy. These features, among others, are described in the following detailed description, which details various nonlimiting examples of embodiments of the present invention.

Many distinct types of events/venues no matter the size can utilize an embodiment of the invention to enhance user experiences. An event generally refers to the reason people convene, whether it be at the same place/time, or at separate places but at the same general time or even at different times altogether. Certain events can have an abundance of activity such as sporting events, rock concerts, trade shows, livestock shows, comic conferences, the circus, and the like. Other events, however, may require a certain amount of decorum, such as cultural/artistic performances, ceremonies, services, and the like. As used herein, an event may also include going to a location of significance such as a historic building, a museum, a zoo, and the like. Events can be indoor, outdoor, or both.

Generally, a venue is where the event takes place. For example, typical venues for sporting events include, without limitation, stadiums, arenas, gyms, rinks, grandstands, and the like. Similarly, venues for performing arts can include amphitheaters, concert halls, theaters, pavilions, and the like. Conferences may take place at conference centers, whereas community events may take place at community centers, tents, places of worship, and the like. In the case of locations of significance, the venue and the event may be one in the same, although embodiments are not so limited.

In an embodiment, the interactive DEP that the user interacts with may be in a "book-like" format that users are familiar with such as digital "flip book." This type of format may be useful for artistic performances and ceremonies as they emulate a traditional paper program. As with a paper program, the interactive DEP may have a cover page with the name of event and cover art. Using a ballet as an example, the pages after the cover page may include a breakdown of the story being told (e.g., by the act); bios, pictures, and videos of the dancers, the choreographer, the conductor, orchestra members; listing of patrons and levels of patronage, listings of upcoming events, advertisements, and the like. Interactive features found in the ballet's DEP may include being able to select and pay for merchandise, tickets for upcoming events, food and/or drinks, patronage donations, as a few nonlimiting examples. Dynamic features that may be available in a ballet's DEP may include videos and video replays of performance highlights with or without augmented reality capabilities. In a certain embodiment, the proprietor may have the capability to enable the interactive DEP only when the performers are not preforming such as before, during, and after the performance. Embodiments, however, are not limited to the forgoing description.

An event such as a graduation ceremony may also use a "book-like" format for an interactive DEP. In addition to the traditional information included in a graduation program, an interactive DEP page a list of all graduating students with each student's name containing a link to a page dedicated to that student. A student's dedicated page having images, videos, accomplishments, future plans, links to the student's pictures in the yearbook, and the like. Furthermore, each student's dedicated page may include a video clip of the student as he or she crosses the stage, which is available for replay, with or without additional augmentation. In a certain embodiment, a user, such as a parent, may be able to create a static or subject matter associated with a nonfungible token (NFT) document from the dedicated page for their student to commemorate the event. Embodiments, however, are not limited to the forgoing description.

A trip to the zoo or the like may utilize a fresh style of DEP altogether. Another nonlimiting example of a possible interactive DEP format is a "tabbed" interactive DEP that can easily take the user to the information in which the user is interested. In this case, each tab may bring the user to information about a different exhibit and/or animal in the exhibit. The tabbed page may include video, images, and snippets of information about the exhibit/animals. This way, all users can access information about the exhibit/animals without having to crowd around a small sign that is difficult to read. Furthermore, video on exhibit/animal page may include footage of a live experience such as a feeding, meet the trainer, or other live presentation. Thus, if the user is in a different area of the zoo at the time of the experience, the user can still enjoy the experience. Even if the user is at the exhibit during the experience the user may want to watch via the interactive DEP as crowding may make it difficult to get a good in-person view. The zoo interactive DEP may also include features such as ordering and paying for food, drinks, merchandise, and the like right from the interactive DEP. Embodiments, however, are not limited to the forgoing description.

Figure 2:
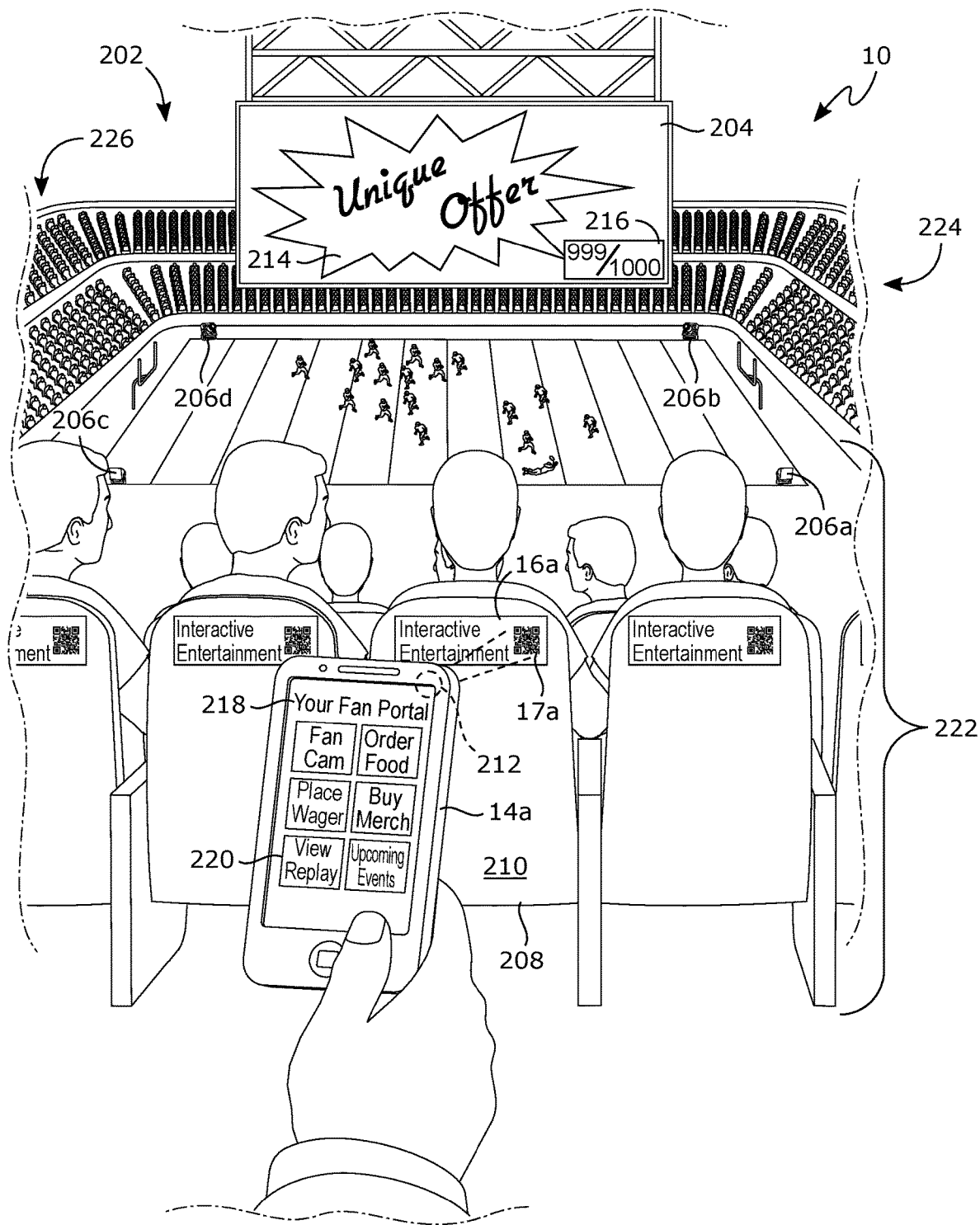
FIG. 2 depicts a stadium comprising a plurality of seats, rows, and sections and a user device that is accessing a user portal including an option for viewing an interactive digital event program.

A sports event, such as a football game may utilize another, different format for its interactive DEP. Referring to FIG. 2, a fan portal (218) or similar format may be the interactive DEP for a football game; the fan portal (218) having selectable options (220) that link to various features or modules such as concessions, merchandise, donations, a roster, statistics, a stadium map, and a schedule, as a few nonlimiting examples. Dynamic content in an interactive DEP for a football game may include replays, statistics updates, an interactive map to guide you to where you want to go, and images to name a few nonlimiting examples. Alternatively, the fan portal (218) may have a selectable option (220) for a book-like, tabbed, or similarly formatted interactive DEP. In this case, the fan portal (218) may include cursory information relating to players and the like, and the interactive DEP may have detailed information about players, the team, etc. Thus, there may be a certain amount of cross over between the fan portal (218) and the interactive DEP. This may be intentional to allow users to access interactive features, dynamic content, or both through either the fan portal (218) or the interactive DEP, whichever is easier for the user. Embodiments, however, are not limited to the forgoing description.

The forgoing examples detail just a few of the possible format, content, and feature/module variations that may be available to a proprietor when contemplating an interactive DEP. Further variations are described more fully hereinafter with reference to the accompanying drawings, which form a part hereof and which show, by way of illustration, specific exemplary embodiments by which the innovations may be practiced. The embodiments may, however, be implemented in many different forms and should not be construed as limited to the embodiments set forth herein; rather, these examples are provided so that this disclosure will be thorough and complete, and will convey the broad scope of the embodiments to those skilled in the art. Among other things, various embodiments may be methods, systems, media, devices, or any similar or equivalent arrangements known to those skilled in the art. Accordingly, the various embodiments may take the form of an entirely hardware embodiment, an entirely software embodiment, or an embodiment combining software and hardware aspects. The following detailed description is, therefore, not to be taken in a limiting sense.

A high-level overview of an exemplary system (10) is shown in FIG. 1. The system (10) may include an administrator device (12), a platform (20), a user device (14a) associated with an event user (e.g., physically at the event/in the venue), a user device (14b) associated with a remote user (e.g., not necessarily at the event/in the venue), a plurality of tags (16a, 16b) and one or more networks (18). Generally, each user device (14a, 14b) may be used to scan, read, or otherwise detect (collectively "scan") machine-readable code ("MRC") (17a, 17b) associated with a respective tag (16a, 16b). The act of scanning a tag (16a, 16b)/MRC (17a, 17b) initiates communications between the user device (14a, 14b) that scanned the tag (16a, 16b) and the platform (20), which may result in the rendering of the interactive DEP by a Web browser and/or other application running on the user device (14a, 14b). Communications between user devices (14a, 14b) and platform (20) is typically via one or more networks (18), which may include, without limitation, the Internet, mobile networks, cloud-based platforms, or combinations thereof.

A proprietor may use a network of encoded tags (16a, 16b) to identify points of interest (e.g., locations, objects, people, etc.). The number of tags (16a, 16b) in the network and placement of tags on, in, or near points of interest is at the discretion of the proprietor to fit its particular assets and needs. Further, a proprietor may add to or subtract from the number of tags (16a, 16b) in the network at will. Thus, the number of tags (16a, 16b) in a proprietor's network may be dynamic, either more or less than an original network of tags. Each tag (16a, 16b) in the network of tags has a unique identifier (tag ID), which may be used to identify a particular point of interest. For example, a tag (16a, 16b) may be situated on or near a seat in a stadium, and the user who purchased a ticket to sit in that seat is the "limited owner" or renter of that seat for a particular event. In certain embodiments, it may be possible to have multiple copies of the same tag, each with the same tag ID, in locations where multiple scans would be desirable at the same time by multiple users. Thus, at the entrance to a stadium, a plurality of tags could be located at different entrance points, each having the same tag ID.

As is implied in FIG. 1, a certain number of tags (16a) may be present at the venue ("in-venue tag"), and additional one or more tags (16b) may be remote from the venue ("remote tag") where the MRC (17b) is displayed in/on a video transmission, signal, or the like, or on a Web page associated with the event, venue, and/or television network, as a few nonlimiting examples. Of course, there is the possibility that a user at the event/in the venue scans the remote tag (16b) with his/her user device (14a). Each user device (14a, 14b) may also include, or may eventually include, a unique identifier (22a, 22b) to uniquely identify the user device (14a, 14b) and a digital wallet (24a, 24b) to securely store sensitive information such as a driver's licenses, account information (e.g., banks, crypto currencies, credit cards), titles, tokens, tickets, vouchers, coupons, other digital file (301a, 301b), and the like.

The proprietor may also access platform (20), albeit via the administrator device (12) and the one or more networks (18). The administrator device (12) may be located at the venue, or it may be at a location remote from the venue. Generally, the proprietor may access a proprietor portal (FIG. 3 at [322]) hosted by platform (20) to perform administrative and/or other activities such as determining what content (or other) will be sent to the user device (14a, 14b) in response to scanning a tag (16a, 16b).

In addition to hosting the proprietor portal, platform (20) may host a variety of other services including, without limitation, event user and remote user access to content associated with the event, venue, proprietor, and the like. As such, platform (20) may include, or may include access to, one or more servers, databases, application programming interfaces (APIs), artificial intelligence/machine learning algorithms, other algorithms, code, blockchains, blockchain platforms, geofences, third party integrations, timestamp, and more, which is detailed below, with reference to accompanying figures.

FIG. 2 shows an exemplary venue (202), which includes a portion of system (10) shown in FIG. 1. In this case, the venue (202) is a football stadium including a jumbo screen (204), recording devices (206a, 206b, 206c, 206d), seats (208), and a plurality of tags such as tag (16a). Although a stadium is shown, the venue (202) can be any venue: small, large, indoor, outdoor, permanent, temporary, one structure, several structures, an entire city, and variations thereof. Thus, a venue (202) can be any area or space occupied by or intended for something, and as such associated amenities and accoutrements may drastically vary from venue to venue. In this example, the stadium has jumbo screen (204), which may display a wide variety of video content as is customary for a football game, though such display screen is not necessary for functionality of the system. The stadium also includes optional recording devices (206a, 206b, 206c, 206d) such as video cameras for recording the football game and other activity, which is also customary for this type of venue (202). Likewise, an event may be any event including sporting events, artistic performances, trade shows, conferences, ceremonies, services, self-guided tours (e.g., at museums, historic sites), and zoos as a few nonlimiting examples. Notably, museums, historic sites, zoos, and similar examples may be both the venue and the event or house the event.

In the example of FIG. 2, each seat (208) has a seatback (210) with a tag (e.g., 16a) disposed thereon. In this way, event users can easily see a tag (e.g., 16a) directly in front of them while they are sitting in their seats (208). Thus, the tag (e.g., 16a) that the event user sees is associated with the seat (208) in which the user is sitting. Tag association with a particular seat (208) is desirable in embodiments that take advantage of knowing the event user's seat location such as for food or merchandise delivery directly to the seat (208), as nonlimiting examples. In-venue tags (e.g., 16a), however, are not limited to being positioned on seatbacks (210); they may be placed in a wide variety of locations within a venue (202). For example, if in-venue tags (16a) are associated with particular seats (208), they may be placed in any other location on or near the associated seat (208) such as an arm rest, a cup holder, on the seat (208) next to the event user's leg, on the ground, or on a structure near the seat (208) such as a wall, a pillar, or the like. It should be noted that in-venue tags (16a) may be associated with other points of interest, and thus may be placed at or near the points of interest such as entrances, levels, sections, isles, loge seats, individual people (e.g., with a tagged badge, tagged ticket, or the like), restrooms, various additional possibilities, or combinations thereof. Therefore, while one example of in-venue tag (16a) placement is illustrated in FIG. 2, in-venue tag (16a) placement should be broadly construed to include any placement suitable for use as described herein. Tags (16a) may be associated with one or more groupings, for example, by a section, (222, 224, or 226), wherein grouping of tags (16a) may provide certain benefits in the various embodiments detailed herein. Alternative placement schemes that may be devised by one skilled in the art, consistent with the teachings of the present invention, should be considered within the scope of the present disclosure.

As was mentioned with respect to FIG. 1, each tag (16a, 16b) in the system (10) has a machine-readable code (17a, 17b) associated therewith. The term machine-readable code ("MRC") as used herein should be broadly construed to include "graphics" type codes such as quick response (QR) codes, universal product code (UPC), snapcodes, and/or any other type of machine-readable graphics (e.g., having a pattern, matrix, or the like) coding known in the art or later developed. Importantly, as used herein, the term machine-readable code/MRC should also be construed to include "chip" technologies that store data on a chip such as, without limitation, near-field communication (NFC) and radio-frequency identification (RFID) technologies, as is known in the art or is later developed. Thus, MRC can be read, scanned, detected, or otherwise decoded (collectively, "scanned") by an appropriately enabled (e.g., camera, QR scanner, and/or NFC reader [212]) user device (14a, 14b).

In-venue tags (16a) may be physical (e.g., tangible), digital (e.g., virtual/intangible), or combinations of both forms. Physical tags may be constructed from diverse types of materials. In the case of tags having one or more graphical/matrix type codes such as QR codes, barcodes, and the like, the code may be printed, etched, fabricated, or the like on materials such as paper, glass, plastic, metal, fabric, and the like, as a few nonlimiting examples. In the case of NFC/RFID enabled tags, chips/antennae may be adhered to, attached to, embedded in, or fabricated on (or combinations thereof) a natural or manufactured material such as metal (e.g., aluminum, stainless steel), semiconductor, wood, polymer (e.g., plastic), film, glass, and combinations thereof, without limitation. The material may be incorporated into or affixed (e.g., adhesive, or other form of attachment) where desired. Digital tags may be displayed on a screen or communicated via radio waves. In the case of QR codes, barcodes, and the like, the graphical code may be displayed on a display screen such as the jumbo screen (204) or a display screen associated with the event user's seat (208), other locations/point of interest, or combinations thereof. Thus, the in-venue tag (16a) may be a video display, such as LCD, LED, e-ink, or other visual display and/or text accompanying the MRC (17a). In fact, most, if not all, remote tags (16b) will be a display screen such as on a television screen, computer screen, appliance screen, and the like, having the MRC (e.g., 17b) displayed thereon, or text on the display screen identifying the MRC (17b), although embodiments are not limited thereto.

Information encoded on or in each tag in the system (10) may include an address to direct a request (e.g., for an interactive DEP) from the user device (14a, 14b) to a server or the like on the network (18) such as a server on platform (20). The address may be in the form of a uniform resource identifier (URI) such as a uniform resource locator (URL), according to a nonlimiting embodiment. In this way, when the user scans the tag (16a, 16b) with the user device (14a, 14b), the user device (14a, 14b) sends a request to the appropriate network (18) location. In the example shown in FIG. 3, when the event user uses his/her user device (14a) to scan tag (16a), the event user device (14a) obtains an address from the MRC (17a) associated with the scanned tag (16a) and sends a request via the network (18) to the address destination. As one example, the address is a URL that causes the event user device (14a) to send a request to a redirect/identification server (302), on platform (20), which receives the request. Similarly, when the remote user uses his/her user device (14b) to scan the MRC (17b) on a screen (304), a similar URL is obtained which causes the request from the remote user device (14b) to be sent to the redirect/identification server (302), which receives the request.

In a typical embodiment, each tag (16a, 16b) in the plurality has a unique tag identification number (i.e., "tag ID"), which may be appended to the URI/URL, although embodiments are not so limited. The tag ID may be used by the platform (20) for several reasons, one of which is to identify a point of interest associated with the tag (14a, 14b) via a tag ID lookup. For example, when a request comes from the event user device (14a), the platform (20) knows that the request came from within the venue (202) and is associated with the seat (208) in which the event user is sitting. And when the request comes from the remote user device (14b), the platform (20) knows that the request is in response to scanning a tag (e.g., 16b/MRC 17b) in transmission, on a Web page, or the like, and the platform (20)

knows which transmission/Web page is associated with the scanned tag (16b). In an embodiment, the tag ID may be appended to the URL (or URI) such as by one or more parameters, pattern matching techniques, or other such mechanism for encoding information in a URI, URL and/or browser request.

Figure 3:
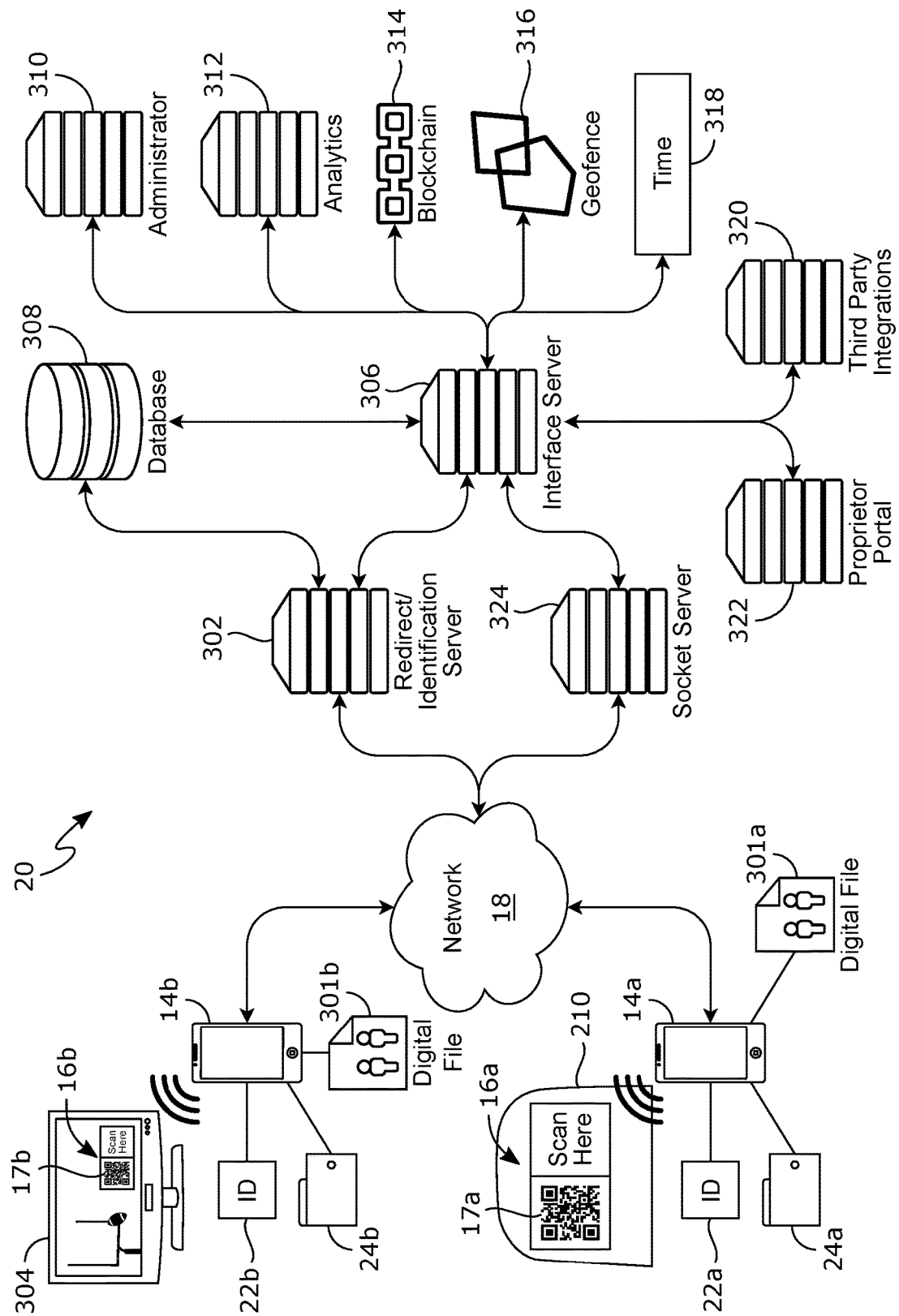
FIG. 3 depicts an embodiment of a system for accessing target information from a user device from within a venue or outside of a venue and various backend platforms for implementing certain target information or for delivering content to the user device.

FIG. 3 details an exemplary infrastructure that may be used by platform (20) although infrastructures are not limited thereto. This infrastructure may include the redirect/identification server (302), an interface server (306), a database (308), an administration server (310), an analytics server (312), a blockchain, access to a blockchain, or both (314), a geofence (316) a timestamp (318), one or more third party integrations (320), the proprietor portal (322), and a socket server (324). Generally, user device (14a, 14b) communicates with the platform (20) via redirect/identification server (302) as was previously described. Redirect/identification server (302), accept requests from user devices (14a, 14b), sends responses to user devices (14a, 14b), and performs various other methods as described herein. As one nonlimiting example, the redirect/identification server (302) may forward information (e.g., URLs, parameters, etc.,) from user device (14a, 14b) requests to the interface server (306). The interface server (306) manages most, if not all tasks involved with processing requests, such as handing off/directing tasks, functions, calls, and the like where needed. The interface server (306) may also return request responses to the redirect/identification server (302). If a request came from a user device (14a or 14b), then the redirect/identification server (302) forwards the response to the requesting user device (14a or 14b). Examples of tasks, functions, calls, and the like that the interface server (306) may hand off include, without limitation, database (308)/blockchain storage, lookups, etc., administrative and backend tasks/functions to the administration server (310), analytical tasks/functions to the analytics server (312), geolocation tasks/functions (316), time/timestamps (318), API calls to third party servers for third party integrations (320) and establishing socket connections via socket server (324).

Figure 4:
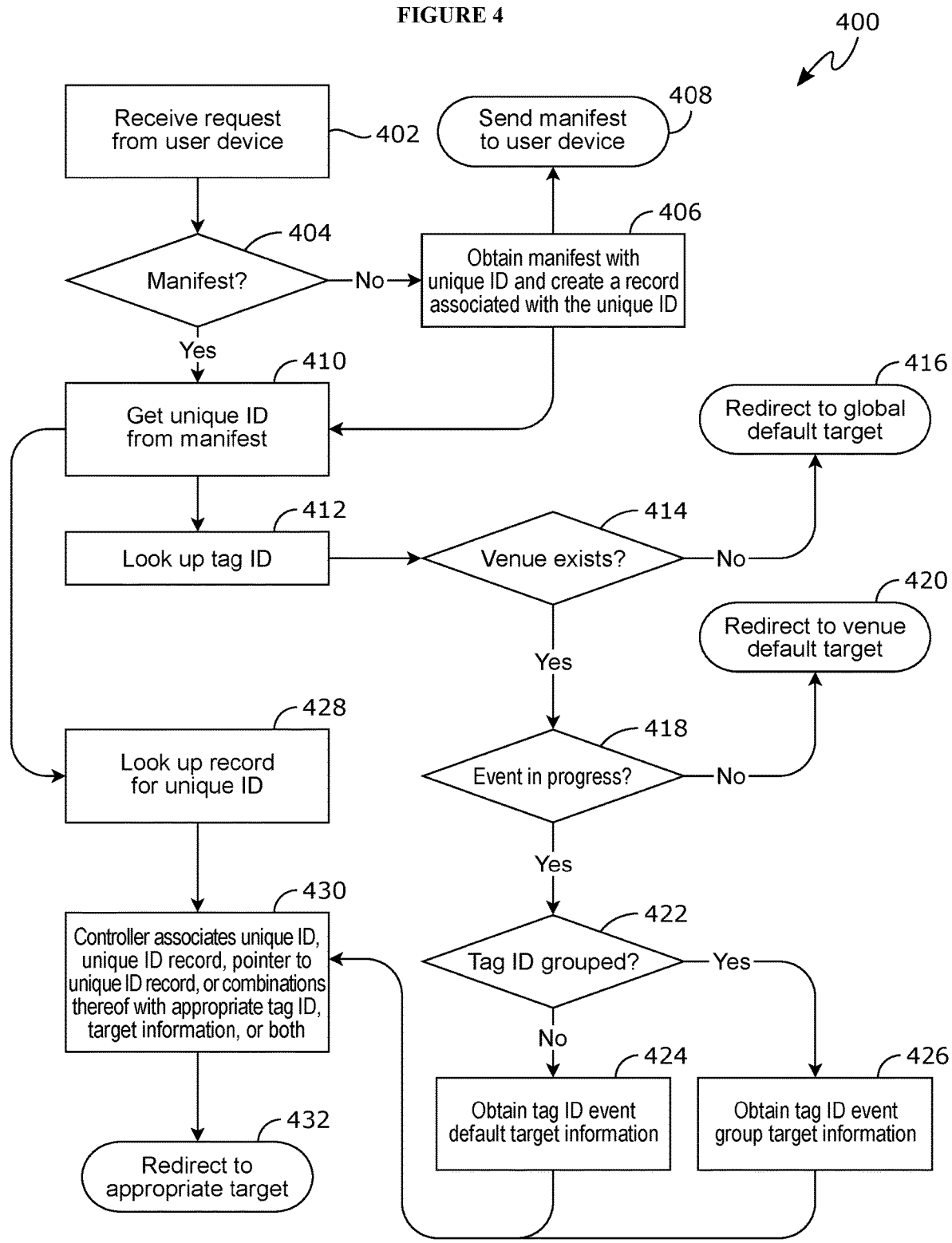
FIG. 4 depicts an embodiment of a system for identifying and using information particular to a user device and/or to a tag for directing the user device to an appropriate target.

Referring to FIGS. 3 and 4 together and using the request from event user device (16a) as an example, a method (400) may begin with the redirect/identification server (302) receiving the request (step 402) from the event user device (14a). From there, the redirect/identification server (302) may check to see if the event user device (14a) has a manifest (containing the unique ID, or just the unique ID alone) loaded thereon (step 404). If no, the redirect/identification server (302) may obtain a manifest and assign a unique ID (e.g., from database [308]) for the event user device (14a, step 406). The manifest includes a unique ID to identify the event user device (14a) with an identifier that is not shared with any other user device (e.g., 14b). The redirect/identification server (302) will also cause the unique ID for the event user device (14a) to be stored in a database such, as database (308), as is appropriate for the database management system (step 406).

As used herein, the term "record" refers to information that is stored in an electronic or other intangible medium without limitations on how the data is structured. A record may include and/or point to related data. For example, a record for a unique ID may include the unique ID and any other data related thereto, which may be stored in database (308) or other appropriate data storage. The record may be the user device record. After obtaining the manifest and/or the unique ID, the redirect/identification server (302) may then send the manifest together with the unique ID to the event user device (14a, step 408), which may be maintained on the event user device (14a) in a digital wallet, other secure repository, or both. At step (410), the redirect/identification server (302) may maintain a copy of the unique ID for further use in the method (400), other methods described herein, or both. If the event user device (14a) already has a manifest (step 404, yes), the redirect/identification server (302) obtains the unique ID from the manifest (step 410). In an embodiment, the redirect/identification server (302) may also obtain data such as current time, date, location, etc. from the event user device (14a), manifest, request, or combinations thereof at step (410).

In an embodiment, the redirect/identification server (302) may pass information needed to further method (400). For example, the tag ID may be passed to the interface server (306) for a tag ID lookup (step 412), such as in database (308), the administration server (310) and/or any other suitable database or server. In this instance, the redirect/identification server (302) obtained the tag ID from the request made by the event user device (14a). In an embodiment, the tag ID is appended to the URL, and thus the entire URL, or a portion thereof, may be passed to the interface server (306) for use in looking up the tag ID. Looking up the tag ID provides information about the venue (202) and/or event. To clarify, when a particular venue (202) installs tags (16a) and/or uses tags (16b), the tag IDs for the installed/used tags (16a, 16b) are associated with the point of interest and the particular venue (202). Thus, if a tag is installed proximate seat 1, row A, section 100, database (308) information associates the installed tag's (16a) tag ID and that particular seat (208), which is in that particular venue (202). Since the tag ID is known to belong to a particular venue (202), the interface server (306), the administration server (310) via the interface server (306), any other suitable server, or combinations thereof makes a series of determinations using the tag ID, which was received in response to a request from a user device (14a, 14b) prompted by scanning the tag (16a, 16b). One determination is if the venue (202) is actively implementing platform (20) services (step 414). For example, the venue (202) may have tags (16a) installed but it is no longer using the tags (16a), or it is not using the tags for a particular event. If not, the event user device (14a) is redirected to a global default target (step 416) that may inform the event user that the services are no longer available, are temporarily out of service, or the like. If the venue (202) is actively implementing platform (20) services, the method (400) may make another determination. At step (418), the method (400) may determine if a particular event is currently (or soon to be) in progress, or recently ended.

In an embodiment, an event may be determined to be in progress based on the time that the event is scheduled to begin. Since many venues (202) open before the actual event begins, and close after the actual event ends, the window set for an event to be in progress may encompass a given amount of time before and after the actual activity begins/ends. In an embodiment, the time that the "event in progress" determination is made (step 418) may be recorded to serve as a timestamp to approximate the time that the event user device (14a) scanned the tag (16a). In other words, the unique ID, tag ID, and time determination may be recorded for later use, in certain embodiments. If the event is not in progress, the event user device (14a) may be redirected to a venue default target (step 420) such as a Web page for the venue, or another Web page such as a page to identify that an incident has occurred at the venue (202) at the point of interest in which the tag (16a) was scanned. Incidents may encompass any sort of incident such as a need for something to be cleaned up to calling emergency services.

If the event is in progress, the method (400) may also determine if the tag ID belongs to a grouping of tag IDs (step 422). Tags (16a, 16b) may be grouped for many reasons and in many different ways including a particular tag (e.g., 16a, 16b) being in a group of just that tag (16a or 16b). And even if grouped, individual tags (16a, 16b) retain their uniqueness. Tags (16a, 16b) may also belong to more than one group. As one nonlimiting example, in the stadium of FIG. 2, the tags (16a) may be grouped by seating type or section (e.g., 222, 224, or 226), e.g., VIP seats may belong to one group, loge seats to another group, and discount/student seats may belong to yet another group. If data associated with the tag ID indicates that the tag belongs to a group, the event user device (14a) may be redirected to a version of the interactive DEP for the particular group. For instance, the interactive DEP for users sitting in VIP or loge seats may include premium content, offers, and the like, whereas the version of the interactive DEP for users sitting in discount/student seats may have content and features that typically appeal to students, recent graduates, or the like. Thus, the method (400) obtains the information it needs to enable redirection to the determined version of the interactive DEP (step 426) for the group. If data associated with the tag ID indicates that the tag does not belong to a specific group, the event user device (14a) may be redirected to a default interactive DEP for the event. Thus, the method (400) obtains the information it needs to enable the redirection (step 424) to the default interactive DEP. In an embodiment, the information needed for redirection may include a URL for the interactive DEP with parameters, values, patterns, or the like appended thereto such as a DEP ID to identify the version of the interactive DEP and the tag ID, although embodiments are not limited thereto.

Method (400) may simultaneously process other data such as looking up one or more records associated with the unique ID (step 428). In embodiments, the platform (20) may gather information relating to user activities via the user device (14a, 14b) and unique ID. For example, the platform (20) may gather data relating to tags (16a, 16b) that the user has scanned in the past (across a variety of different events, venues, or the like) and activities associated with those tag scans (e.g., purchases made, content looked at, coupons downloaded), although embodiments are not limited thereto. This data may be stored in association with the unique ID assigned to the event user (or other) device (14a). Thereafter, a controller may associate the unique ID, its record, its record location or the like with the tag ID, DEP ID, a URL, any other determined information, or combinations thereof (step 430). The event user device (14a) may then be redirected to the appropriate version of the interactive DEP that has been determined for the event user device (14a).

When a request comes from a remote user device (14b), the method (400) starts out essentially the same as with the event user device (14a). That is, the redirect/identification server (302) receives the request (step 402), checks for a manifest containing a unique ID (step 404), assigns a manifest with a unique ID if one has not yet been assigned (step 406), and sends it to the remote user device (14b, step 408) for secure storage thereon. If the remote user device (14b) has a manifest, then the redirect/identification server (302) obtains it (and other information such as a unique ID) from the remote user device (14b). Either way, the redirect/identification server (302) has the information that it needs such as unique ID, URL, tag ID, and the like, and forwards the information to the interface server (306) to continue the method (400). The interface server (306) may then look up, or cause to look up, the record associated with the unique ID (step 428) assigned to the remote user device (14b). At the same time, the interface server (306) may cause a determination to be as to whether the venue exists (step 414). In this case the interface server (306), or other server, may look at the data associated with the tag ID to determine from where the tag (16b) that was scanned originated. For example, the MRC (17b) may have originated from a particular signal, transmission, etc., (e.g., network, regional network, etc.), Web site (e.g., for the venue, a streaming service, etc.) or the like. If, the method (400) determines that the venue does not exist, for example, if the tag is to an unrelated element, then the remote user device (14b) is redirected to that unrelated element or to a global default target (step 416), for example if the tag is related. Assuming that the venue in this case does exist, the interface server (306)/method (400), then determines whether the event is in progress (step 418). If the signal, transmission, Web page, or the like is transmitting an event as it is occurring in real time then the event is in progress. Such can also be determined by a timestamp or time record set within the system. Either way, in an embodiment, the time the determination is made may be recorded by the platform (20). If the event is not occurring in real time (e.g., the user is watching a recording after the fact), then the remote user device (14b) will be redirected to an appropriate target such as a Web page relating to the event (step 420). However, the proprietor can set any time parameter to define "real time." For example, a proprietor may desire to allow recordings watched within N number of days of a live event to constitute real time. The interface server (306) may then determine if the tag (16b), via the tag ID belongs to a group (step 422). For instance, different tags (16b) may be associated with different signals, transmissions, Web sites, or the like. Even so, these tags (16b) may be a subset within the group based on predetermined criteria such as being within a geofence (316). Thus, if the tag (16b) belongs to a group, or a subgroup, the remote user device (14a) will be redirected to the interactive DEP for the appropriate group/subgroup, and if not, the remote user device (14a) will be redirected to the default interactive DEP. The default interactive DEP for remote users may or may not be the same as the default for event users. Either way, the information relating to the determined version of the interactive DEP is obtained (steps 424, 426). At step (430), a controller may associate the unique ID, the record for the unique ID, a pointer to the record for the unique ID, the tag ID, and interactive DEP information such as a URL, DEP ID, or both. Thereafter, the remote user device (14b) is redirected to the appropriate version of the interactive DEP (step 432), as was described with respect to the event user. In certain embodiments, the step of (428) may be provided in parallel to or concurrent with the lookup of the tag ID (step 412), where the unique ID is necessary for determining any of the other elements. Furthermore, the unique ID may be stored, for example in local memory or cache, which is readily accessible or known to the system after step (410).

In an embodiment, the user device (14a, 14b) may receive a redirect URL from the redirect/identification server (302) at the end of method (400) to redirect the user device (14a, 14b) to the appropriate version of the interactive DEP. For instance, the method (400) may return a DEP ID to identify the particular version of the interactive DEP. The DEP ID, tag ID, unique ID (and/or information associated therewith), or combinations thereof may be appended to the redirect URL for the interactive DEP, which is sent to the requesting user device (14a, 14b). The requesting user device (14a, 14*b*) then uses the redirect URL to send a new request, this time for the interactive DEP, which is received by the redirect/identification server (302) and is forwarded to the interface server (306) for processing. Alternatively, the DEP ID, tag ID, and unique ID may be used by the platform (20) without sending a redirect URL to the requesting device at the end of method (400). Regardless of the forgoing, the requesting user device (14*a* and/or 14*b*) receives the interactive DEP associated with the redirection whatever version of the interactive DEP that may be. In an embodiment, the interactive DEP may be an application delivered by way of one or more Web pages, files, data, information, or combinations thereof. As one nonlimiting example, the fan portal (218) may be a version of the interactive DEP identified by the DEP ID, and it may include application code "wrapped" or embedded in in an HTML document. Application code includes, but is not limited to, Web application code, progressive Web application code, cloud-based application code, native application code, native mobile application code, other such code, or combinations thereof. The HTML document (and cascading style sheet, etc.) generally determines the layout of what the user sees as is known in the art.

Furthermore, interactive DEPs are not necessarily always the same or even the same result of redirection. In fact, the same tag (e.g., 16*a*) may cause a user device (e.g., 14*a*) to be redirected to distinct interactive DEPs or other targets of redirection depending upon when the particular tag (16*a*) is scanned. For example, a venue (202) hosts many events over the course of a season, year, decade, etc. Each event may have its own interactive DEP as the individual events are distinct. For example, the fan portal (218) may be the interactive DEP for a game in progress, such as the football game shown in FIG. 2. The game in progress is between team A and team B. The next game (or other event) hosted at the venue (202) may be a soccer game; thus, the fan portal (218) for the soccer game is different from the fan portal (218) for the football game. In other words, the two fan portals (218) are distinct targets for redirection. Coordinating an interactive DEP (or other target) with a particular tag (16*a*) may be achieved by assigning a distinct DEP ID (e.g., target ID), so that the user device (14*a*) is redirected to the football fan portal (218) during the football game and the same user device (14*a*) can be redirected to the soccer fan portal (218) during the soccer game even though the exact same tag (16*a*) is scanned by the exact same user device (14*a*). Of course, this is one nonlimiting example. A proprietor may use a single tag (16*a*) to redirect a user device (14*a*, 14*b*) to any desired target including a version of an interactive DEP. Thus, the target to which the user device (14*a*) is redirected may be changed from game-to-game.

A proprietor may also change a target during the course of a particular event. For example, referring again to the fan portal (218) shown in FIG. 2, the user may use the fan portal (218) to partake in activities such as buying food or merchandise, placing a wager, view replays, etc. However, at any time during the event, the jumbo screen (204) may display a hidden "unique offer" (214) that is only available to the first 1,000 users who respond to the "unique offer" (214) after it is displayed on the jumbo screen (204). A countdown (216) on the jumbo screen (204) shows the number of event user devices (14*a*) that have claimed the "unique offer" (214). When the threshold number (1,000) is reached, the unique offer may be revealed and is no longer available to any other users. One way an event user may respond to the hidden "unique offer" (214) is by scanning or rescanning the tag (16*a*) while the unique offer (214) is available. In this case, the user device (14*a*) may be redirected to a Web page or the like, for the unique offer (214), e.g., to input information, make payment, or the like, per a process that is the same as/similar to the method (400). The redirect target of this scan, however, is the "unique offer" (214) and not the fan portal (218). Another way a user may be able to respond to the "unique offer" (214) is by a pop-up window (e.g., in/over the fan portal [218]) or the like, which may be pushed via the socket server (324) in a nonlimiting embodiment. Thus, the term "target" should be broadly construed although it may be described herein with respect to obtaining a version of an interactive DEP or other specific examples. One of ordinary skill in the art would understand a target of redirection as described herein may be a multitude of different targets with various purposes, designs, capabilities, and the like. Therefore, the target to which a particular tag (16*a*, 16*b*) is assigned, may be changed by simply changing the target identifier (e.g., "target ID") associated therewith.

There may be instances where the content delivered via the interactive DEP may need to be changed, updated, altered, released, opened, or other such stipulations based on a rule and/or other conditions. Rules may be defined to force a modification of content already delivered, deliver additional content, information, and/or data, release content, and/or make other such changes as would be appreciated by one skilled in the art. In this nonlimiting example, the interactive DEP delivered at (432) FIG. 4 includes a Web application, such as a progressive Web application (PWA), that has a pull function, which may be rule-based. The pull function, as one nonlimiting example, may be time based, requesting information to be pulled from the platform (20) via the interface server (306) every 10 seconds, minutes, N seconds, N minutes or the like. As another nonlimiting example, the pull function has the ability to have data updated on a rolling basis. In the sporting world, this is common when updates are provided to the score of a game, the time left in a game, or both as nonlimiting examples. The platform (20), however, may push rolling data to a user device (14*a*, 14*b*) instead of having it pulled from the platform. Pushed data may be sent to user devices (e.g., 14*a*, 14*b*) without being requested. Data may be pushed to a user device (14*a*, 14*b*) for any number of reasons, a few of which are detailed herein. Thus, information, data, etc., may be pushed to a user device (14*a*, 14*b*), pulled for a user device (14*a*, 14*b*,) or both. In many instances, a Web application or the like may be based on a template having dynamic elements embedded therein. The contents of such dynamic elements may be altered via push techniques, pull techniques, or both. Content, data, information, and the like, may be pushed and/or pulled via a socket connection utilizing a socket server (324) or any other socket connection, communication connection, protocol, or combinations thereof as is available to the platform (20) under a set of given circumstances. As one example, the JSON data format may be utilized by one or more aspects of the platform (20) to interchange data, although embodiments are not so limited.

Figure 5:
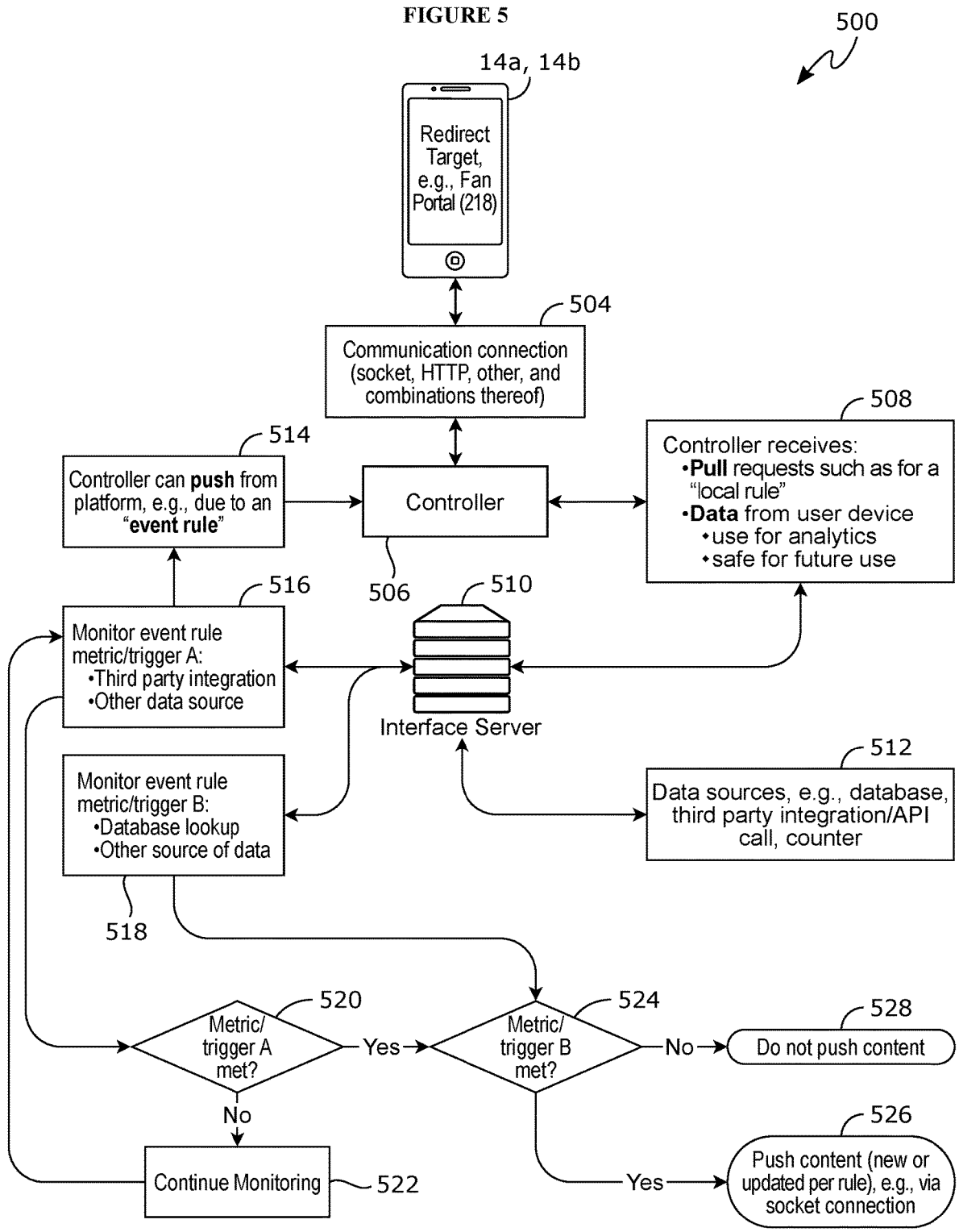
FIG. 5 depicts an embodiment of a system wherein the system is enabled to push or pull data or information or due to triggering events or rules to modify or augment a target delivered to a user device.

The method detailed in FIG. 5 may be invoked while the version of the interactive DEP (e.g., fan portal [218]) is loading on the requesting user device (e.g., 14*a* and/or 14*b*), after the interactive DEP is already loaded on the requesting user device (14*a* and/or 14*b*), or both. As with all methods detailed herein, steps in the method (500) may be used in whole or in part, in the order shown or a different order, be executed on one device or more than one device, be used in combination with some/all of the other methods described herein or as is known in the art, or combinations thereof.

Using fan portal (218) as a nonlimiting example while referring to FIG. 5, oftentimes it may be desired to alter information, regardless of type (e.g., video, images, instructions, etc.,) while the user is using the fan portal (218). Information may be altered using push, pull, and other techniques, taking advantage of the communication connection (504). The communication connection (504), which may be a socket connection or any other appropriate type of connection, allows communications between the user device (14a and/or 14b) and the platform (20) via the one or more networks (18). A controller (at 506) may be a set of software code for managing, directing, or generally being in charge of one or more rules, enabling pushing and/or pulling of information per the rules. In this example, rules may be used to change content within the version of the interactive displayed or to be displayed on the user device (14a, 14b). The interface server at (510) may be the same interface server shown in FIG. 3 (306), just at the data sources at (512) may be the same data sources shown in FIG. 3 such as database (308), administrator server (310), analytics server (312), blockchain (314), geofence (316), time (318), third party integrations (320), and proprietor portal (322), without limitation. Moreover, interface server at (510) may facilitate utilization of the forgoing, in the same manner or similar manner as described with respect to FIG. 3. Thus, in a sense, user device (14a or 14b), communication connection (504), interface server (510), and data sources (512) are shown in FIG. 5 just to help the reader visualize interactions detailed in FIG. 5.

Examples of rules that are detailed with respect to FIG. 5 include event rules and local rules, although embodiments are not so limited. Generally, an event rule is monitored by the platform (20) and if satisfied causes data to be pushed to a version of the interactive DEP and a local rule, when invoked, causes a user device (14a, 14b) to request data (i.e., pulls data) from the platform (20) to cause a change to occur within an interactive DEP. An illustrative example of an event rule is if team "A" scores a touchdown, push a digital offer to all user devices (14a, 14b) that have scanned tags (16a, 16b) regardless of DEP version. Here, the metric or trigger of the rule can be monitored (step 516) such as by directly sending a request or query to a data source (at 512) via the interface server (at 510), receiving data from the data source (at 512) on a regular basis such as every 5 seconds, 5 minutes, or the like (via the interface sever [at 510]), or combinations of both. The platform (20) may to monitor for the metric/trigger e.g., a touchdown (step 520) and continue to do so (step 522) until a metric/trigger e.g., a touchdown has occurred (step 520, yes). If the rule has been satisfied, the platform (20), can push the digital offer to all of the qualifying user devices (i.e., that have scanned a tag [16a, 16b]). Thus, in some instances the particular version of an interactive DEP that is loaded on a user device (14a, 14b) does not matter.

A more complex event rule may include more than one trigger/metric. For example, the rule may be that if team "A" scores a touchdown, push a digital offer for a free beer to all event users over the age of 21 that have used their user device (14a) to scan a tag (16a) in the venue (202). The first metric/trigger of whether a touchdown has been scored may be monitored as described above. The second metric/trigger may be monitored (at 518, 524) in the same or similar manner if the metric/trigger warrants, or it may be determined before or after the first trigger/metric has been satisfied. For example, since the second metric/trigger in this instance relates to age, a query may be sent to one or more data sources (at 512) to find all users who are over the age of 21. Records stored on database (308), for example, may be consulted to look for age data in connection with unique ID data to determine if the person who has loaded the fan portal (218) on his/her device (14a) is of legal drinking age. As an alternative source of data or for any other reason, the interface server (at 510) may cause another data source (at 512) to be consulted to determine user age. For example, one or more third party integrations (320) may have age information; thus, an API call or other query may be made to the third party integrations (320) to obtain age data. As with the first example, if the first metric/trigger (step 520, no) is not met (i.e., touchdown), then the platform (20) continues to monitor the metric/trigger (step 522). If the metric/trigger (step 520, yes) has been met, the platform (20) determines if the second metric/trigger (518) has also been met (step 524). Where the second trigger/metric has not been met (step 524, no) then the interactive DEP on the user device (14a) is not updated (step 528), such as with the digital offer. Depending upon the rule, the second metric/trigger may continue to be monitored or not. For example, if the digital offer was to be sent only one time, then once both metrics/triggers for the rule are satisfied, and no additional monitoring is needed. If, however, the rule is to send the same digital offer (e.g., for a beer) every time team "A" scores a touchdown, the second metric/trigger would not have to be redetermined in this instance since even if the user turned 21 that day, the user's age would not change. Of course, if the event went past midnight, the rule could be structured to recheck ages after midnight. This does not mean that for a given rule a second (or third, or fourth, etc.,) trigger/metric would never need to be monitored. Should an additional metric/trigger be defined by a rule that needs additional monitoring, the method (500) will be allowed to do so. Going back to step (524), if the determination is yes, the digital offer may be pushed (526), such as via the controller (at 514, 506) to those users who have scanned a tag (16a) at the venue (202) and who are at least 21 years old. Pushed content may update an element, such as a dynamic element of the interactive DEP, cause a popup to show on the user device (14a, 14b), send content to a digital wallet (24a, 24b), or any other way to push content as is known in the art.

Local rules, as an example, may be associated with one or more versions of an interactive DEP being utilized for a given event. Referring again to FIG. 2 and fan portal (218) as one example of an interactive DEP, each section of seats (222, 224, 226) may represent a grouping of tags (16a) such as student/discount seats, loge seats and all other seats (e.g., default). As such, when a tag (16a) is scanned by a user in section (222) the device (14a) may be redirected to first template of fan portal (218), when a tag (16a) is scanned by a user in section (224), the user device (14a) may be redirected to a second template of a fan portal (218), and when a tag (16a) in section (226) is scanned the user device (14a) it may be redirected to a third template for a fan portal (218). Thus, all users may be redirected to a fan portal (218), but each fan portal (218) may be based on a different template, hence a different version of the interactive DEP. In this way, a proprietor may deliver customized content to users in different sections based on the template for the version of the interactive DEP to which the user device (14a) was redirected. Local rules, other elements, or both may be written into each version's template to further customize content, which in some instances may be on an individualized level. That is elements of application code may be rules built into the system to provide the content delivery determined by the system, or can be applied at an earlier stage, e.g., at a tag ID or group target information (step 422), which can provide a different original redirect URL/target than is received by or directed to, for another tag ID in a different group.

Referring back to FIG. 5, the interface server (306, at 510) may determine, or cause to be determined, if there are any rules associated with a given template for a version of the interactive DEP such as a version of the fan portal (218). This is especially true where the rule may be designed as an event-type rule where content may be pushed to a device (14a). In this case, however, the rule may only be provided in a given template such as for users sitting in loge seats. A given template for an interactive DEP, however, may also have local rules written therein. For example, a rule associated with a fan portal (218) template to be distributed to loge seats, may be if the user has season tickets, then include a digital offer for discounted season tickets for the following year. Thus, per this illustration the local rule may desire to pull/acquire (at 508) season ticket information before, during, or after the version of the interactive DEP (e.g., fan portal [218]) for the loge seats is loaded on the event user device (14a). To obtain this data, the database may be queried (at 512), via the interface server (at 510), using the unique ID to check data records for the requested information (e.g., purchased season tickets). As with the push example, if the database (at 512) does not store such information, the information is inconclusive, the local rule requires confirmation from an outside source, or other such situations, other data sources (at 512) may be consulted via the interface server (at 510). If the local rule is satisfied, then a digital offer for discount tickets (next season) is sent to the interactive DEP. If the local rule is not satisfied, then the interactive DEP uses a "default" digital offer/content such as an ad for non-discounted season tickets, upgraded tickets for the next event to be held at the venue (202) or another, similar example. In an embodiment, data associated with the unique ID may be pre-analyzed to see if the local rule has been satisfied. Alternatively, data associated with the unique ID may be gathered (e.g., from a database, a third party integration such as a ticketing service, or the like) and analyzed when the event user device (14a) makes the request. As yet another option, the data may be pre-analyzed and verified/checked for changes upon the event user device (14a) request. The interface sever (306) may take all of the variables from the interactive DEP application code, template, rules, and the like and send requests/queries to the appropriate data sources or links to the data sources (at 512). The data sources may include data from the database (308), blockchain (314), geofence (316), timestamp (318), third party integrations (320) such as data servers/databases, analytics server (312), and administration server (310), and a counter (at 512), without limitation.

In some implementations, a counter may be needed. For example, a counter may be enabled to maintain the countdown shown in FIG. 2 (216). A counter may be software on platform (20) that may be used as a counting mechanism for rules or other reasons. As such, the counting mechanism may be configured to meet the counting requirements of a rule or other counting need. As an illustration, a counter may count the number of tags (16a) scanned in a venue (202) during a particular event; count the number of tags (16a, 16b) scanned by a particular user device (14a, 14b) in a predetermined time window; count the tags (16a) scanned by a particular user during a particular event; count the number of times a user has interacted with the interactive DEP delivered to that user device; or other such nonlimiting illustrations.

Thus, while the interactive DEP is displayed on a particular device (14a, 14b), dynamic content may be seamlessly and dynamically updated/changed per coding/interactions between the user device (14a, 14b) and the platform (20). Certain dynamic changes occur through push and pull techniques such as those detailed by FIG. 5. However, dynamic updates/changes may further take place through the use of various third party application programming interfaces (APIs) and their respective functionality. At a high level, the interface server (306) may connect, or may cause the third party integration server (320) to connect, to third party hardware/software (e.g., server) via one or more third party APIs/API calls to access the respective third party integration/functionality as is known or will be known in the art. Thus, third party integrations/functionality may push or pull information through analytics server (312), retrieve it from database (308) or another data store, or combinations thereof, for real time/live streaming, updating, changing, and the like as is called for by rules/instructions associated with the target (e.g., version of the interactive DEP) of the tag ID. Furthermore, embodiments allow for the use of interactive, two-way communications between user devices (14a, 14b) and the platform (20) such as via the socket server (324) and/or a socket API, or the like as is known in the art.

A situation, however, may arise where a third party API or the like is not available for a particular event or functionality. In this situation the interactive DEP provider, proprietor, or other such party may update the desired functionality manually via platform (20) and push the updates to the user devices (14a, 14b). Likewise, if there is video content in the interactive DEP, it too can be updated in real time throughout the game via the platform (20). In addition to versions, rules, settings, customizations, and the like, an interactive DEP may be modified due to a change in the backend template. If the backend template is altered while an event is in progress, these changes may be immediately viewable on the front end of the interactive DEP by the users. Thus, it should be understood that there are numerous variations regarding which interactive DEP features, elements, navigation strategies, and the like are implemented, organized, and presented within a given interactive DEP and embodiments are not limited to what is described herein. It should be noted that upon the end of the event or if the user closes the interactive DEP, the communication (at 504) is severed, and content may not be updated unless or until a connection (e.g., at 504) is reestablished.

As is also indicated in FIG. 5 at (508), the platform (20) may collect a large amount of data via user devices (14a, 14b). For example, after scanning a tag (16a, 16b) the platform (20) may receive data from the user device (14a, 14b) such as date, time, and GPS or other location, the device orientation (i.e., landscape, portrait), type (e.g., iPhone, Android), IP and other addresses, and operating system as a few examples. Thus, methods such as methods (400, 500, or both) may be configured to collect and aggregate data. Additionally, tools such as cookies, widgets, plug-ins, and similar tools may also be used to obtain data from user devices (14a, 14b). This, and other, information may be stored in a data source (at 512) such as database (308) or other data storage and in association with the unique ID. Data acquired using the aforementioned tools and other tools/techniques may relate to user engagement with a target such as an interactive DEP as one nonlimiting example. Such data may relate to digital offers presented to the user, digital offers downloaded by the user, products viewed by the user, purchases made by the user, to name a few examples. Such tools/techniques may also gather data relating to other user engagements such as total screen time, Internet browsing (times, sites/pages accessed, software used), updates to Web pages, other Web sites visited, the Internet, and the like. The user may also directly provide information via the user device (14a, 14b) such as by inputting personally identifiable information to obtain opportunities or offers such as unique information relating to user interests, user responses to questions, generic information about age or sex, or any other type of personally identifiable information. Such data is of high value to, for example, advertisers, proprietors, and the like, as it provides a large insight into consumer purchasing and Web browsing habits.

Data related to user devices (14a, 14b) may also be obtained from third party sources. As one example, when a query, request, or the like sent to a third party, the platform (20) may provide certain information with that query, request, etc., such as the unique ID, tag ID/interactive DEP information, or combinations thereof. Thus, data returned by the third parties may also be stored (e.g., temporarily or persistently) in association with unique IDs, tag IDs, interactive DEP information, or combinations thereof. As one nonlimiting example, service providers such as mobile/cellular providers may be queried to obtain information about user devices (14a, 14b). The unique ID identifying a particular user device may be sent to the service provider to obtain information about the particular device, or the service provider may provide information that may be later associated with a particular device. Either way, the platform (20) may collect and store information about users via the unique ID assigned to each user device (14a, 14b). As another nonlimiting example, information associated with unique IDs assigned to user devices (14a, 14b) may be collected from various third party integrations (320) such as in-venue/event metrics, integrated third party metrics, ticket brokerage, and other tools, without limitation to the forgoing. In-venue/event metrics may include data collected relating to the venue, event, or both. For example, information relating to user purchases at the venue and/or during an event such as tickets, food, merchandise, and upgrades and the like may all be gathered and stored in association with the unique ID. Similarly, ticket brokerage integrations (e.g., 320) may be used to gather information from ticket brokers who sell tickets for the venue (202), event, or both, and may include a wide range of marketing data, not only about ticket purchases made, but also related information about the user. Thus, third-parties, including third party metrics integrations (320) may enable collecting information about users, user devices (14a, 14b), or both from third parties including those who participate in a shared program or who sell or otherwise provide marketing information, demographics, and other data about the user.

In addition to collecting and storing data associated with unique ID, the platform (20) may analyze such data, which may or may not be recorded in association with unique IDs. Data analysis may occur while it is being collected, after it is collected and before it is stored, after storage, or combinations of the forgoing. Data, raw, analyzed, or both, may be stored in database (308) or another data store (at 512) such as blockchain (314), without limitation. The analytics server (312) may communicate with various aspects of the platform (20), to ensure data received from various sources is appropriately captured for decision making, analytics, and the like. That is, analytics server (312) may communicate with (either directly or via the interface server [306]), user devices (14a, 14b), third parties, third party integrations (320), time/timestamp (318), geofence (316), blockchain (314), database (308), even proprietor portal (322), or combinations thereof, so that data is captured as needed for desired analytics, decision making, and the like. For example, data may be subject to artificial intelligence analysis include machine learning/pattern recognition/deep learning as is now known or will be known in the art. Collected and/or analyzed data may be coupled with other information relating to the user/user device (14a, 14b), such as the unique ID associated with the user device (14a, 14b) for a variety of reasons, including content selection as one nonlimiting example.

Content for display on user devices (14a, 14b) may be customized in numerous ways as has been detailed with respect to methods (400 and/or 500). Content may also be customized where data/data analysis shows that a user has, or group of users have particular preferences. These preferences may be utilized to modify content, such as advertisements that are delivered to that user/group of users. Furthermore, data analysis may allow the proprietor to generate rules specific to a user/group of users, send custom e-mails, push socket notifications or other messaging based upon the user's interactions/group of users' interactions with the platform (20), other such similar examples, or combinations thereof. Indeed, this provides for multiple opportunities for interaction and communication between the proprietor and the user to continue building relationships that can then be mined for longer-term relationships. As yet another implementation, the platform (20) may utilize unique IDs together with known information associated therewith to deliver unique advertising to users via third party advertising services. For example, where available, the platform (20) has the ability to interface with advertising platforms to deliver a customized experience based on the user's search history or user information as a whole. Taking the forgoing together, it should be apparent that content provided to a particular user or group of users may be customized or modified as was described above with respect to FIGS. 4 and/or 5 and that data/information gathered as the user is engaged with the event interactive DEP or the like, may be used to update/modify the interactive DEP content in real time, upon a subsequent scan of tag (16a, 16b) by the user device (14a, 14b), or both (e.g., at 508). For example, the socket connection (at 504) may be used to deliver pulled content, push content, notifications, and the like, and/or dynamically update content while the event is in progress.

Analytics may also determine which feature, elements, or the like provided by one or more versions of an interactive DEP a user or group of users interact with the most or spend the most time viewing. Thus, advertising on high-usage pages, features, elements, etc. may come at a higher cost. In other words, proprietors may charge a premium to advertisers wishing to purchase the ability to place content, such as advertisements or digital offers on the pages or features of the interactive DEP that receive the most traffic.

The forgoing has been described largely with reference to a sports environment where event users can scan tags (16a) located proximate each seat (208)/other point of interest or remote users can scan MRCs (17b) that appear on a screen such as a television or computer display. Other environments may utilize the same sort of tag (16a) placement strategy, such as an artistic performance where tags (16a) may be placed proximate a seat. However, many artistic performances are not televised or otherwise visually distributed while the performance is taking place. Thus, these proprietors may enable an option for patrons at a specific donation level, or season ticket holders to remotely access the performance as the performance is taking place such as via an account on a Web site where the user can scan an MRC (17*b*). Alternatively, certain remote users may receive a digital communication such as an e-mail or physical communication such as a card or badge that is similar to a credit card having information encoded thereon so that the remote user can scan the MRC (17*b*) on the badge to access the interactive DEP that is associated with the scanned MRC (17*b*). In this way, remote users that are unable to attend a particular live performance may still be able to enjoy the performance or features thereof via an interactive DEP. And since the interactive DEP for remote users may have distinctive features enabled (e.g., replays, filters) during a performance that are not available to an event user (so as to not distract the performers) the remote user may be able to watch the entire performance on the remote user device (14*b*) and access other features of the interactive DEP during the live performance.

Concerts and concert/festivals (collectively "concerts") may utilize the tags (16*a*) already in place at the venue (202) in which the concert is being held if the proprietor so allows; alternatively, concert proprietors may utilize a system that is not attached to the venue (202), or they may use both. As an example, concert proprietors may include tags (16*a*) separate from or integral with concert tickets, passes, credentials, or the like so users can scan (or click on if digital) the MRC (17*a*) to access the desired interactive DEP. In an embodiment, the ticket, pass, credentials, or the like may be a badge or badge-like so that it can be attached to a lanyard, put in a wallet, etc. Lanyards may be distributed with the ticket, pass, credentials, etc., or they may be purchased. As an incentive to purchase a lanyard, the lanyard may be associated with its own tag (16*a*) and associated target (e.g., a digital offer, upgraded interactive DEP, etc.). In an embodiment, remote users who are unable to actually attend the concert may still be able to enjoy certain aspects of the concert via the tag (16*b*) associated with a ticket, pass, credentials, etc. In an embodiment, remote users may opt to purchase just a tag (16*b*) so that they may enjoy certain aspects of the concert via an interactive DEP without being there. As one nonlimiting example, the tag (16*b*) may enable the remote user to access live or recorded video of the concert, which would not otherwise be available without concert attendance.

In the case of schools and the like, tags (16*b*) may be linked to particular students and distributed to students and parents alike. For example, the student's tag (16*b*)/MRC (17*b*) may be on the student's school-issued ID or student-related identifier, and the parent's tag (16*b*)/MRC (17*b*), which may be the same as or different from the student's MRC (17*b*), may be distributed to parents on a magnet, badge, card, or the like so that the student/parent can simply scan their respective tag/MRC (17*b*) (with respective user device [14*b*]) to access a interactive DEP with information relating to the particular student such as grades, classes, upcoming activities, as a few nonlimiting examples. In fact, with respect to graduation, concerts, sports events and the like, a secondary interactive DEP may be accessed via a link in the "primary" interactive DEP, although embodiments are not so limited. That is, parents, teachers (with their own tag/MRC [16*b*/17*b*]) to connect to their own version of an interactive DEP, other employees and the like may access interactive DEPs for events relating to the school in more than one way. One way may be via the tag/MRC (16*b*/17*b*) that may be used on a regular basis as described above, or via tags (16*b*) permanently or temporarily placed at the school gym, auditorium, or the like, which will enable access to the event-specific interactive DEP.

Historic sites, museums, zoos, and the like may use any of the forgoing strategies and other unique strategies to enhance visitor experiences via one or more targets of a tag (16*a*, 16*b*), including a version of the interactive DEP. As one nonlimiting example, tags (16*a*) may be located at or near entrances for users to scan with their devices (14*a*) to obtain a version of the interactive DEP. Additional tags (16*a*) may be located at, near, within, etc., various exhibits to provide supplementary content. In this way, the interactive DEP connected to a tag (16*a*) may be streamlined and supplemented at-will. In an embodiment, users may buy merchandise/concessions via in-venue tags (16*a*) much like the stadium example. By making a purchase, the user may use a tag (16*a*) associated with the purchase to connect to yet another target for that particular tag (16*a*) such as a coupon, discounted entry tickets, and free entry tickets, an upgraded interactive DEP as a few nonlimiting examples. In fact, with any of the forgoing examples tags (16*a*, 16*b*) may be placed on or with merchandise of all sorts to be able to access targets such as coupons and/or other incentives.

Thus, per the forgoing description, it should be appreciated that an interactive DEP can be tailored to achieve the proprietor's goals. Clearly, one proprietor's goals for an interactive DEP may differ from another proprietor's goals, and as such interactive DEPs may expressed in a multitude of different formats, layouts, designs, versions etc., that may include numerous variations on functions, features, rules, instructions, etc. Nonetheless, interactive DEPs typically include at least one feature/module with dynamic content that may be altered in some manner at least during the course of the event. Thus, what an individual user may experience via that user's interactive DEP is not necessarily the same as what any other user will experience. Using FIG. 2 as a nonlimiting example, all in-venue users may receive an interactive DEP in response to scanning a tag (16*a*) with their respective user device (14*a*). Each stadium section (222, 224, 226), however, may receive a different version of the interactive DEP, due to redirection as was explained with respect to FIG. 4. And within a particular version, content that one user sees may be different based on user data and/or rules as was explained with respect to FIG. 5. Even if the version and content are the same, individual users typically will not interact with the interactive DEP in the same way at the same time, which will also cause each user to have a unique experience.

Figure 6:
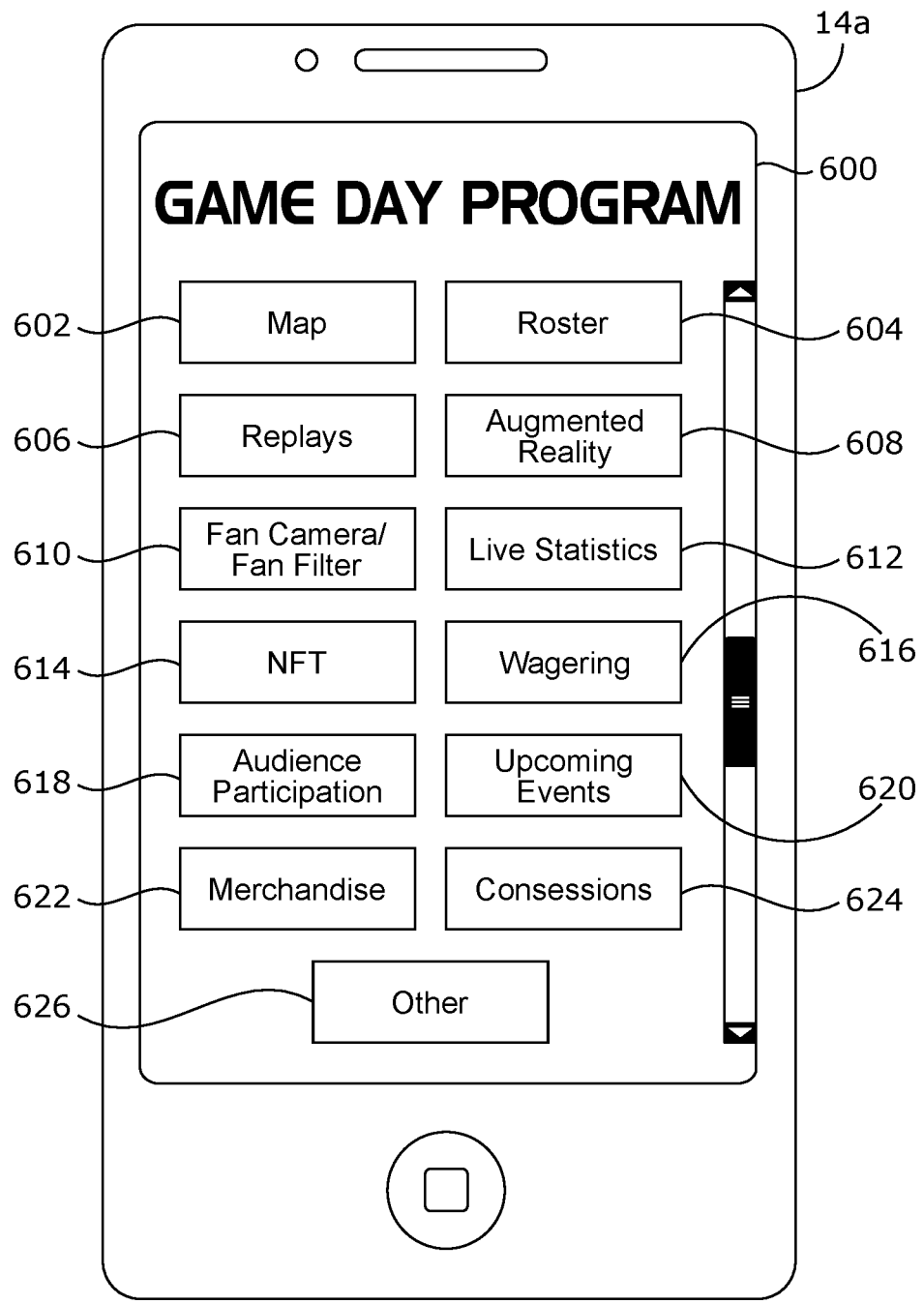
FIG. 6 depicts a user device displaying an exemplary interface for an interactive digital event program.

There are many features/modules that a proprietor may include in an interactive DEP, including, without limitation, a map (602), a roster (604), replays (606), augmented reality (608), fan camera/fan filter (610), live statistics (612), NFT (614), wagering (616), audience participation (618), upcoming events (620), merchandise (622), concessions (624), and other (626), as is shown on the features page of the interactive "1 Game Day Program" (600) of FIG. 6. The game day program (600) is an extensive "fan portal" (218) type format for an interactive DEP. Although advertisements are not shown on the home page for the game day program (600) of FIG. 6, it should be understood that advertising and other content may be included on the home page, and/or any other page/pages of the game day program (600). Further, advertising, especially dynamic advertising, is an important feature of an interactive DEP since advertising may offset proprietors' costs and allow users to obtain an interactive DEP for free.

Figure 7:
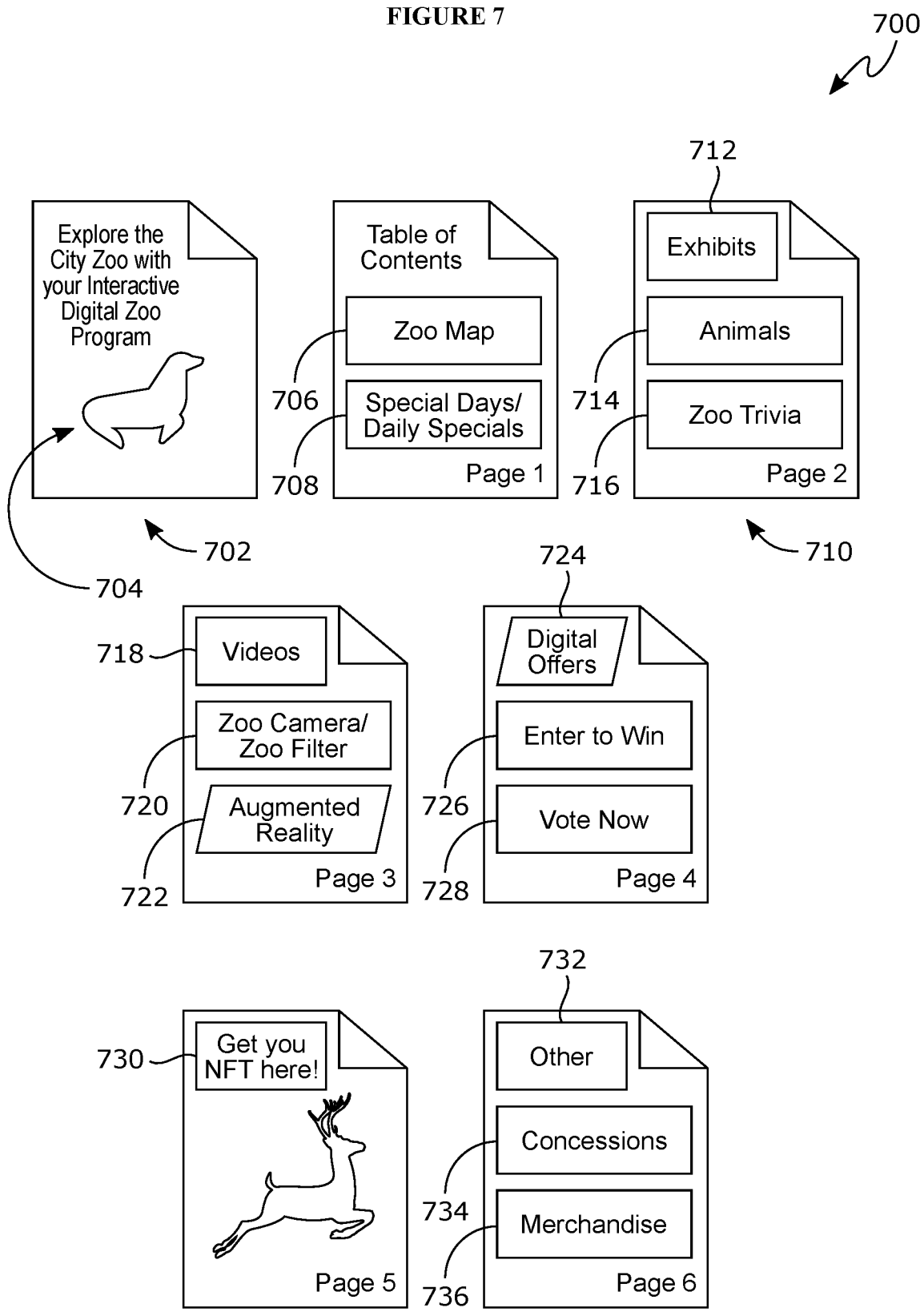
FIG. 7 depicts a further embodiment of an exemplary interface for an interactive digital event program.

In some instances, a proprietor may select a book-like format rather than a "fan portal" type format to implement an interactive DEP. As yet another alternative, a proprietor may include a book-like interactive DEP as a feature/module of a "fan portal" type interactive DEP (600). FIG. 7 depicts a nonlimiting example of a few pages taken from a book-like interactive DEP (700) distributed by a city zoo. The cover page (702) of the interactive DEP (700) may be what zoo visitors see after they scan a tag (16*a*), or it may be what a user sees after linking to the interactive DEP (700) via a selectable option on a home page of a fan portal type interactive DEP. The cover page (702) may emulate a cover page of a traditional paper program. However, icons, images, or the like on the cover page (702) may link to other pages either within the interactive DEP or external thereto. Features/modules listed on the Game Day Program (600) may be included on the pages of the interactive DEP (700) shown in FIG. 7, or the interactive city zoo DEP (700) may include modifications of a "standard" feature/module. For example, on page 2 (710) of the City Zoo's interactive DEP (700) the "exhibits" (712) and/or "animals" (714) feature/modules may be variations on a game day "roster" feature depicting an animal, here a seal (704). And, although not shown in FIG. 7, the book-like interactive DEP (700) may also include a navigation pane/bar to assist with navigating a digital document as is known in the art. Since interactive DEPs are meant to fit many different proprietors' needs, features/modules may be created/customized to meet those needs and are not limited to the examples described herein. Furthermore, although only two types of formats are shown herein, it would be understood that such formatting is a matter of choice, and an interactive DEP may be formatted, designed, laid out, have features, functions, and other accessories not detailed herein, that are still within the spirit of the invention.

MAP FEATURE: It is not unusual for an interactive DEP to include an interactive map of the venue/event, especially where the venue/event is large or difficult to navigate. The interactive map may utilize one or more third party integrations (320), other integrations, databases or other sources information, rules, instructions, API calls, other calls, user device data and/or capabilities, or combinations thereof to provide the desired map functionality. For example, if Janet, who is sitting in seat 1, row A, section 100, of a stadium wants to know where the nearest restroom is located, she may select the map feature (e.g., FIG. 6, [602]) to link to a map of the stadium. Alternatively, if Janet is at the zoo and she wants to know where the nearest restroom is relative to her current location she may turn or navigate to the page that has the map of the zoo or a link to the map of the zoo (FIG. 7, [706]).

Map features may include a search function to search for a specific location within the stadium, may automatically provide routes to the most frequently visited locations such as restrooms and concessions, locations that Janet has visited in the past in the same venue or at different venues (e.g., restrooms), or combinations of the forgoing. Alternatively, Janet may simply tap her desired destination on the map to receive a route to the destination. The route may be the shortest route, route with the least traffic, destination with the shortest line, or the like, in a manner that is analogous to routes that are shown on street maps using data gathered from various sources. As one nonlimiting example, the analytics server (312) may receive data about Janet from database (308) using the unique ID for her device (14*a*), mapping and/or other functionality from a third party source (320), geofence (316) data to determine how many user devices (14*a*) are within a predetermined area (e.g., to estimate line length, traffic patterns etc.,), GPS data from Janet's user device (14*a*), other user devices (14*a*), or both, any other available data, or combinations thereof, to determine the best route for Janet to reach her best destination and display that route on the map in the interactive DEP. The analytics server (312) may receive data directly via queries to the various data sources or via the interface server (306), which may manage the activities to get Janet the information she is seeking. Map related content may be pushed, pulled, or both, via the socket or other connection between the user device (14*a*) and the platform (20).

In an embodiment, dynamic content may be unlocked in response to using the map feature/module. For example, if Janet is trying to find her favorite concession or restaurant at the event/venue and she uses the map, a digital offer for the concession or restaurant may be displayed on or in the interactive DEP, may automatically be loaded into the digital wallet (24*a*) on her device, or other such examples. When Janet goes to pay for her food, she may then redeem the digital offer. The map feature may also identify additional tags and or areas of interest, wherein a user may be directed, via the map, to certain tags to engage with the event or the environment defined by the map. Such maps can also be utilized, therefore, for scavenger hunt like games, which require a user to find, identify, and scan certain tags as part of an event or as part of a challenge or task within one or more of the embodiments.

Remote users have little need for an interactive map of a venue, event, or the like. Thus, a map function may not be included in the interactive DEP distributed to a remote user. Alternatively, the map feature may use GPS coordinates, geolocation information, geofence data, tag ID information, other such information, or the like, and provide a suitable map to the map feature such as the area surrounding the remote user device (14*b*). This may be especially helpful to those users who are out of town and do not know their surrounding areas. Like with Janet, if the remote user searches for a participating restaurant, a digital offer for the restaurant may be displayed on or in the interactive DEP, delivered to the digital wallet (24*b*) on the remote user device (14*b*), or other such location. Since the digital offer is being sent to a remote user it may have an expiration date that is longer than an in-venue digital offer, which typically expire when the venue closes after the event.

ROSTER: It is also not unusual to have a roster, or a modified roster in an interactive DEP. As is shown on the game day program (600) there may be a selectable link to a roster (604). Rosters formats and layouts are practically limitless and can range from simple to complex. For example, a simple roster may show an image of the person and their associated data such as name, position, schools attended, and certain statistics. A complex roster may include full pages dedicated to each person with images, videos, complete professional history, personal history, personal statistics, player analysis, associated merchandise, NFTs, wagering opportunities, the ability to donate to the player's charitable cause, and more. In contrast to a regular event program, in an interactive DEP typically static elements (e.g., statistics, images, videos, etc.) may be dynamic, updating as the event takes place. These changes may be the result of one or more rules used to push, pull, or both dynamic content to the interactive digital program (e.g., 600, 700). For example, one or more rules may be written to monitor for a metric or trigger related to a particular player such as a personal best, event record, world record, or the like in the same or similar manner that was detailed in FIG. 5. If the metric/trigger is detected while the event is in progress (e.g., most passing yards in a single game), then dynamic content may be updated with fresh content. For example, an image of the player making the historic pass may replace a current image, a video clip of the historic pass may replace the current video, the player's statistics should update, a pre-recoded video may be released, merchandise related to the player may be promoted and/or discounted, a commemorative NFT may be released, and wagers may be taken as just a few examples. As one specific example, a statistic such a record-breaking number of passing yards in a single game, may be tied to an advertising integration such that if the metric/trigger is detected, then a digital offer for a fast food restaurant may be unlocked for users (in-venue and/or remote) to redeem. The user may simply tap on the digital offer to move the digital offer out of the interactive DEP and into the user's digital wallet for redemption at any time and without the interactive DEP. All of this may take place within the interactive DEP during the event as the user is looking at the particular players page or when the user gets to the page (or any other page that the content may be contained on) thanks to various API functionalities and other functionalities connected to the interactive DEP. A roster (604) may be the same or different on different versions of an interactive DEP (e.g., going to different groupings of tags [16a]) or for in venue and remote users or both.

As is shown in FIG. 7, the city zoo interactive DEP (700) includes a modified roster for exhibits (712) and one for animals (714). Modified rosters may also be included in interactive DEPs for other sites such as museums, historic buildings, and similar places. The modified roster for the zoo exhibits (712) may include images and videos showing highlights of the exhibits including feeding times, times when the animals are most likely going to be active, and other information of interest to zoo visitors. The modified roster for zoo animals (714) may include one or more pages dedicated to the animals as individuals, groups, or both, trivia (716) regarding animals or other games related to the animals or the zoo in general. These pages may also include images, videos, merchandise, and the like. Further, video of the exhibits, animals, or both may be streamed in the interactive DEP (700) so that if a special program (e.g., feeding time, meet the trainer, a show, etc.) is happening and a user who cannot get close enough to the action or who is at the other side of the zoo can still see the special program via the interactive DEP. Images may be updated dynamically as well. For example, images may be cycled, taken from a video feed, uploaded by users to share, other similar examples, and combinations thereof. A metric or trigger may be associated with an exhibit or animal so that upon satisfaction of the metric/trigger an action may be taken. As one nonlimiting example, tags (16a) may be associated with each exhibit to direct in-venue users to additional content related to the exhibit and/or animals in the exhibit. Additional content may include histories, stories, video interviews with zoo personnel about the exhibits/animals, additional images, videos, and the like. The platform (20) may be enabled to count, via a counter, the number of times the tag (16a) for the exhibit has been scanned in a day, week, month, year, in total, etc. Alternatively, the counter may be enabled to count the number of times a particular user uses his/her device (14a) to scan distinct tags (16a) in the zoo. When the number reaches a predetermined number (e.g., 10, 100, 1000, etc.) content may be release, unlocked, or otherwise made available per a rule to which the metric/trigger is tied. For example, a zoo sponsor may provide a giveaway to the 100,000th user to scan a particular tag (16a) such as a free zoo membership for the next year, which may appear as a digital offer for the winning user to redeem. Alternatively, after an individual user scans a predetermined number of tags the individual user may receive a digital certificate that enables the user to go "behind the scenes" with a trainer or paint a picture with an elephant or the like. The digital offer, certificate, or the like may be delivered directly to the digital wallet (24a) on the user device (14a), or it may be displayed on/in the interactive DEP and downloaded to the digital wallet (24a) by simply clicking on the offer/certificate.

VIDEO REPLAYS AND OTHER VIDEO: A unique feature of embodiments of interactive DEPs includes the ability to watch a replay of some or all of the event. Although, sports games often show replays of something that just happened, especially when the action is exciting or undergoing analysis viewers generally have little control over what is displayed, when it is displayed and how it is displayed. Within the interactive DEP, however, users may have control over what replay the user watches, how the replay is watched, and when the user wants to watch it. For example, the game day program (600) may have a replay module/feature (606). The replay module/feature (606) may include a listing of replays that have occurred during the game. Thus, the user may select a replay from the list as it becomes available, watch a replay that happened earlier in the game, or both. The user may also be able to control replay speed (regular, fast, slow motion), pause the replay, rewind the replay, stop the replay at any point, and other functions while watching the replay of choice.

Although the game day program (600) has a replay module/feature (606) dedicated to video replays, replays may be distributed elsewhere in the interactive DEP. As one nonlimiting example, replays may be shown on a page dedicated to a player or several players, especially if the replay captured a momentous occasion. Or the same replay may be accessed from more than one location in an interactive DEP. This may be especially true in a book-like format where a user may want to see the replay in context. Taking the city zoo interactive DEP (700) as an example, a list of replays of exciting, cute, or other unique animal activity may be associated with an exhibit (712), animal (714), or both. Nevertheless, the city zoo interactive DEP (700) may have a feature/module (718) dedicated to recordings that can be themed for funny things that animals do, educational videos, or both. Regardless of where replay/recorded videos may be displayed in interactive DEPs, video recordings/e-plays may be cycled, listed, or other presentation to allow the user to select and control the video as the user desires.

Video content is not limited to replays taken from action in the game or the like. Video content may also include interviews with owners, managers, trainers, professional commentators, sponsors; team footage or other footage, advertisements, digital offers, and other content made in video format, or combinations thereof and regardless of interactive DEP format. This type of content may be listed, switched out in real time, cycled, etc., as determined by various rules and/or other instructions that enable the content to be acquired from a data source (e.g., at 512) and delivered to the interactive DEP in a manner the same as or similar to that described with respect to method (500).

Indeed, real time exchange of advertising videos, sponsorship videos, or other videos that may require "viewing time" to be purchased, would allow viewing time to be sold on an ongoing basis, even during the event, which is not possible in print programs. As one nonlimiting example, an in-venue retailer (e.g., concessions, merchandise, etc.) may realize that it has an overstock or surplus of inventory that it would like to unload before the event ends. The in-venue retailer may purchase a time slot for video or other content to be displayed in the interactive DEP. As one option, the backend for an interactive DEP can be modified so that the changes are immediately viewable in the front end (e.g., what the user sees) of the digital program. The backend changes may be global to be applied to all versions of the interactive DEP for the event or select to be applied only for interactive DEPs distributed with in the venue, for a particular grouping, both, etc. Backend changes may be made to one or more templates, rules, a "master templet," "master code," or other such backend changes. Time slots, however, may also be purchased in advance so that certain content is shown during the purchased time much like television advertising is purchased. As yet another option, in much the same way, an advertiser, sponsor, other organization, or the like may purchase time for their message to be shown on the jumbo screen (e.g., FIG. 2 at [204]) or a live televised message. The advertiser et. al., may purchase time for their message to be shown in the interactive DEP at the same time it is being shown on the jumbo screen (204) or on a live broadcast. In this way, the user may be prompted to act on the message directly from their interactive DEP, such as by purchasing food, drinks, merchandise, NFTs, etc., placing wagers, or any other action allowed via the particular version of the interactive DEP displayed on the user device (14*a*, 14*b*), including downloading a digital offer to the digital wallet (24*a*, 24*b*) on the user device (14*a*, 14*b*). Thus, an embodiment offers real-time value-added pricing of advertisements or the like, while simultaneously offering users the most dynamic experience with immediate and actionable content in the interactive DEP.

AUGMENTED REALITY: Many of the experiences afforded by an interactive DEP may also be augmented via an augmented reality (AR) feature/module (608, 722). Generally, the AR feature/module (608, 722) enables a user device (14*a*, 14*b*) to digital elements to be added to or overlayed on objects, images, video, or the like that the camera (FIG. 2, [212]) on the user device (14*a*, 14*b*) is pointing at or that is being displayed on the user device (14*a*, 14*b*) screen. As one nonlimiting example, when Janet is navigating to the restroom, she may point the camera (212) on her device (14*a*) in front of her to see the route superimposed on the image provided by the device camera (212). At the same time, she may receive information about concessions, restaurants, stores, lines, etc. as she is making her way to her destination. Information may also include digital offers that Janet can tap to download to her digital wallet (24*a*). Thus, when in AR mode, Janet may receive a wealth of information about her surroundings just by pointing the camera (212) on her user device (14*a*) in the direction she wants augmented. In much the same way, an AR feature/module may be utilized with the interactive DEP distributed by the city zoo (700). As another nonlimiting example, the zoo may provide supplementary information about exhibits, animals, and other points of interest when in AR mode (722) so that when the user points the camera (212) on her/his device (14*a*) at a particular exhibit, animal, or similar point of interest, information about that exhibit, animal, etc., may be overlayed onto the image displayed on the user device (14*a*). To enable this type of AR activity, the platform may utilize hardware and/or native software on the user device (14*a*, 14*b*), instructions delivered via the interactive DEP, code executed by one or more platform (20) servers (e.g., 302, 306, 310, 312, etc.,); data from the user device (14*a*, 14*b*), database (308), or any other data source; one or more third party integrations (320); or combinations thereof to gather data about the user's surroundings for augmentation thereof.

Users may also view captured video with AR objects, effects, filters, etc., disposed thereon. For example, cameras (FIG. 2, [206*a*, 206*b*, 206*c*, 206*d*]) at the venue (202) may be used to record the game in progress. These cameras may be any type of camera used for this or similar purposes as is known in the art. Cameras (206*a*, 206*b*, 206*c*, 206*d*) may also be equipped or associated with Lidar sensors (light detection and ranging sensors), have high-definition capabilities, have, or be associated with other such enhanced features/capabilities, or combinations thereof. Generally, recorded video may be made available to user in a manner that is the same as or similar to regular video replays except to implement AR activities, the video may first need to be processed to be compatible with certain AR effects. For example, the user may be able to place an avatar on a replay either in a position on the field, on a particular player, on an object such as a ball, or other such options. The replay may then be shown with the avatar disposed thereon, viewed from the perspective of the avatar whether it be on the field, player, object or other, or combinations thereof. In other instances, the user may wish to "draw" on the replay much like a professional commentator or the like. Of course, the forgoing are nonlimiting examples of what a user at any venue or watching any event may do with AR capabilities. Some of the AR playbacks may depend upon third party integrations, especially where there is a need for specialized equipment, specialized processing, etc., This is easily achievable through the platform (20) providing the interactive DEP utilizing one or more third party integrations (320). These integrations (320) may be via APIs, may be directly provided to the platform (20), or combinations thereof. Further, native hardware/software on the user device (14*a*) may be utilized to send and receive data, instructions, or the like to/from the platform (20), and the platform (20) may provide additional server-side processing of data etc. received from the user device (14*a*, 14*b*), the third party integrations (320), or combinations thereof to allow the user to manipulate the AR (or other) replay as desired.

The proprietor does not have to make AR content available all of the time. Certain content may be tied to a rule or rules having one or more metrics/triggers to be satisfied before being made available to users. For example, certain replays (AR enabled or not) may only be available for a window of time after initial release, whereas other replays may only be available if the footage includes a significant occurrence such as a record being broken. As yet another example, a user may have to watch a promotion, take a survey, or participate in some other activity before content is made available to the user.

Advertisers, sponsors, organizations, etc., may also use aspects of the AR feature/module to their advantage. Advertisements or other messages may have to be viewed before the user can access the AR feature/module, they may be overlayed on the AR content, popup during viewing of the AR content, and/or other such similar ways advertising is made available. Furthermore, AR content may be sponsored by a specific advertiser and although not an ad per se, a notation regarding the business, organization, etc., sponsorship of certain content may also serve advertising purposes. For example, sponsored content may have "brought to you by XYZ company" or the like disposed over the content such as at the beginning or end of the content.

Although shown as a separate selectable option on the game day program (600), a fan camera and/or or fan filter (610) may be made available to users. The fan filter feature/module (610) may be a specific use of AR similar to filters used by various types of social media. The filters available via the interactive DEP, however, may be tailored to meet the proprietors needs such as by only offering options that support the team, game, venue, event, or other purpose. For example, the user may be limited to using team colors, mascot, logos, emblems, and the like. Embodiments, however, are not limited thereto. Moreover, fan filters may be integrated with social media platforms to be shared with remote users or others. The city zoo interactive DEP may also offer a zoo camera/zoo filter feature (720) that is the same as or similar to the one found in the game day program (600). In these cases, the available filter may be based on animals at the particular zoo or other famous animals.

The fan camera/zoo camera may be used alone or in connection with the AR feature/module. Generally, the fan camera/zoo camera utilizes one or more third party integrations (320) to provide video images from any angle. This capability may rely on specialized equipment including cameras, computers, sensors, etc., which were mentioned above. The result of this integration is to enable users to see a replay or the like from any available angle: top, bottom, and all around (e.g., the venue/exhibit, etc.) regardless of where the user is located. Thus, the user can see the same video footage from several different angles should the user desire. This technology may also be used to add AR overlays on the playback so the user may add an avatar or the like to a player, ball, or at another position and view the playback from the avatar's point of view.

Advancements in video technologies can generate visual experiences that are beyond normal replay and fan experiences. In an embodiment, the proprietor could deliver a custom message to a user (e-mail, text, push notification), to scan a tag (16a) that would provide a custom AR experience to each user. At the end, the user could be provided with a digital offer to add to the digital wallet.

REAL-TIME STATISTICS: A live statistics module/feature (612) may be especially useful in game day programs or other programs where statistics are commonly collected with respect to the event. Live statistics may be on one or more dedicated pages, sprinkled throughout the DEP such as on a page dedicated to a player, proximate an article, or combinations thereof. Moreover, statistics may be presented as is usual for the event or may be presented as the proprietor desires. As a few nonlimiting examples, statistics for a football game may by team, player, offensive team, defensive team, special teams, quarter, half, game, season, or combinations thereof and without limitation. Statistics may also be used to highlight team and/or player milestones and may even provide a countdown toward the milestone, used to dynamically rank players across a league, on a team, or the like, to play fantasy sports, and for wagering, to list a few examples.

The live statistics module/feature (612) may be updated in real time using one or more rules to push or pull data for the interactive DEP, much like the rules described with respect to FIG. 5. As one example, statistics and related data (e.g., scores, time remaining, time elapsed, other time considerations, etc.,) may be updated at regular intervals (e.g., every N seconds, minutes), upon a change in the score or statistical change, and other metrics/triggers. Updates may be made using data sources such the database (308), analytics server (312), third party integrations (320), and other data sources. As another example, as an image element or the like associated with a statistics element so that when the statistics change so does the image in the image element. For example, player Adams has just scored so the statistics for the game have changed, the statistics for player Adams has changed, and other statistics may have also changed. Adams' image is inserted into the image element next to the statistics change to put a face with the new numbers. Thereafter, Bob sacks the quarterback; thus, statistics change, and so does the image by the statistics (e.g., Bob's image) In an embodiment, one or more rules may be written to define the dynamic updating detailed above. The platform (20) may draw from images of players stored in the database (308) and associated with an identifier that relates the images with a statistics identifier such as a name, player number, position, etc.

Advertisers, sponsors, and other organizations may use statistics to distribute digital offers via the interactive DEP. For example, a rule may be written to allow a sponsor offer to be unlocked, pushed, pulled, or the like if the home team scores 20 points in the first half, or if the home team intercepts twice during the second half, or any other conditions that an advertiser or sponsor may want to tie their digital offer to. Further, the advertiser, et. al., may want only certain users to receive their offer. Thus, the rule may also include a second, third, or fourth metric (as was explained with respect to FIG. 5), to limit distribution to a certain segment of the user population.

Although live updated statistics is interesting in the sports world where statistics, scores, and the like are updated in real time in the digital program as the game is being played, statistics per se are not limited to sporting events. Data may be gathered and analyzed with respect to a wide variety of topics. Taking the zoo for example, statistical information may be distributed within the interactive DEP among other content, be put in a "trivia" form, gathered onto one or more dedicated pages, any other layout option, or combinations thereof. The statistics may relate to animals (e.g., gestation period, life span, estimated numbers in the wild, conservation efforts, feeding habits and amounts), habitats, global warming impacts, and the like or to the zoo or zoos in general such as the average number of visitors per day, week, year, etc., daily, weekly, yearly, etc., costs to run, number of employees, ranking compared to other zoos, area attractions, or other similar type of data.

If statistical information is not available from a third party source, it may be maintained and updated by the interactive digital program provider, the proprietor, or both. Statistics (and/or other information) may be updated manually via one or more platforms (20).

NON-FUNGIBLE TOKENS: Many proprietors are taking advantage of the ability to tokenize memorabilia, collectables, and the like as a way for users to commemorate their participation in and/or attendance at an event. Generally, an NFT is associated with subject matter (digital or physical) that is perceived to have some value. The NFT may record a transaction relating to the subject matter on a blockchain such as a distributed ledger. The subject matter itself, and the metadata (e.g., including interest/rights in the subject matter) may be stored elsewhere such the InterPlanetary File System (IPFS). Proof of the transaction (e.g., purchase of the NFT) may be stored in a digital wallet (e.g., 24a, 24b), or another linked wallet that is designed for such a purpose. The NFT feature/module (618, 724), allows event and/or remote users to acquire an NFT whether it be through a purchase, an auction, freely distributed, or another mode of acquisition.

The acquisition of an NFT may take advantage of one or more third party integrations (320) such as NFT blockchains that host and mint NFTs, NFT marketplaces that list and sell NFTs, other NFT related resources, and combinations of the forgoing. Before being able to acquire an NFT, certain measures may be taken to ensure that the user is entitled to NFT acquisition. As a few non limiting examples, the platform (20) may ensure that the device (14a, 14b) that scanned the tag (16a, 16b) belongs to the person that bought the ticket to the seat, that the device (14a, 14b) that scanned the tag (16a, 16b) is in the proper location, that the tag (16a, 16b) was scanned at the proper time, other verifications, and combinations thereof.

A business may sponsor an NFT to be given away to only those people who purchased tickets for certain seats. Thus, the platform (20) may query data sources such as the database (308), third party integrations (320), or any other data source to determine if the user device (14a) that scanned the tag (16a) identifying the "winning" seat (208) belongs to the ticketholder for that seat (208). Generally, the platform (20) may check to see if there is information associated with the unique ID for the device (14a) and a ticket for the seat identified by the tag ID such as a digital ticket on the device, a ticket purchased via a third party, a paper ticket that can be scanned and confirmed or the like. In the same way, a proprietor may grant the first 100 fans that have scanned an in-venue tag (16a) an NFT for the interactive DEP. In this scenario, the platform (20) could gather data from the user devices (14a), the geofence (316), and the time (318) to ensure that only the confirmed 100 devices are enabled to acquire the NFT. In this example, user 101 and beyond may receive a message that the offer has expired or the like. As yet another example, the city zoo may offer what appears to be an unlimited NFT of, for example, a photo of baby animal right after it was born. The zoo, however, may provide different editions of a photo or ownership rights in a photo by limiting the acquisition to those users at the zoo on a particular day, have scanned a tag (16a) by the exhibit with the baby animal, and by patron level (e.g., gold, silver, bronze, none). In this instance, the platform (20) would verify all of the metrics/triggers to enable NFT acquisition to only those users who have satisfied the rule and how they have satisfied the rule (e.g., patron level, if any) so that the users are only aware of the subject matter for which they qualify per the rule. From the forgoing it should be understood that the ways to incorporate the NFT feature/module (614, 730) into an interactive DEP are only limited by what a rule and associated metrics/triggers dictate if a rule is even used to limit the acquisition of an NFT.

WAGERING: Although wagering, betting, or the like may be more applicable to sporting events or the like, a wagering feature/module (616) may be adapted to enable proprietors to offer raffles, prize drawings, and other enter-to-win type prizes (726). Thus, a wagering feature/module (616, 726) is not limited to sports betting or the like. As with other features/modules, an interactive DEP may have a selectable option (616) to launch one or more pages dedicated to wagering or the wagering feature (616, 726) may be distributed throughout the interactive DEP such as with statistics, on a player page, or other similar setting. Where wagering is related to sports betting or the like, the wagering may be limited to the game in progress, related fantasy sports, or the like, although embodiments are not so limited. Further, for official wagering, a third party integration (320) may be employed with one or more vetted gambling venues are available to the user. To be able to use such a third party integration, the platform may first determine, or attempt to determine that the user device (14a, 14b) is being operated by a person who is of legal gambling age. Such a determination may be made using the unique ID to search data sources such as database (308), official identification (e.g., driver's license) in the digital wallet (24a, 24b), third party integrations (320), other data sources, and the like. And if the user is a remote user, the platform (20) may seek to determine that the remote user is located in a geographical area in which gambling is legal. Again, the platform (20) may use any data available to it to make this determination such as the unique ID in combination with a geofence, device GPS coordinates, etc., or combinations thereof. Verified users (in-venue, remote, both) would need to enable their digital wallet (24a, 24b) or another wallet to allow the third party gambling venue (320) to be able to place bets and deposit winnings. Third party gambling venues, proprietors, advertisers, sponsors, ticketing agents, or other may provide gambling opportunities as incentives for their products. For example, ticketing agents may offer a gambling credit (to qualified users) for expensive seats or hard-to-sell seats, or gambling venues may (320) provide a gambling credit to certain sections, seats, or other grouping, as two nonlimiting examples. Alternatively, a third party gambling venue (320) may randomly select a winning seat, a winning tag (16a) scanned (e.g., at [310]) for the event or the like, where the winner gets free beer for the entire game, a gambling credit, or similar type of prize. Of course, in each of the forgoing situations, the platform (20) may seek to verify that the device (14a) that scanned a tag (16a) identifying a qualified/winning seat belongs to the person that purchased the ticket for the seat as was described with reference to NFTs, and that the person is of a qualified age (e.g., 21), as was described with respect to FIG. 5. Thus, the interactive DEP may provide an avenue to placing live or in-play wagers while being able to see real time statistics, odds, and the like all while an event is in progress and by the scan of a tag (16a, 16b).

In an enter-to-win type of wagering adaptation (726), which may be employed by a venue/event such as the city zoo, the platform (20) may randomly select a winner using data associated with a unique ID or the like. For example, a server may randomly select a unique ID associated with those users who opted to enter to win. A notification may be sent to the user device (14a) associated with that unique ID. A zoo employee may have a "verification code" on a handheld device or the like that the user device (14a) has to scan to confirm that the unique ID for the user device (14a) that scanned the verification code is the same as the one that was selected to win. If the unique IDs match, the user holding the device (14a) may collect the prize. holding the unique ID is the selected to win AUDIENCE PARTICIPATION: An embodiment of an interactive DEP may also include an audience participation feature (618, 728). Not all versions of an interactive DEP for an event may include this feature; it may be distributed to those seats that are more likely to desire this type of content, although embodiments are not so limited. Nonlimiting examples of activities that involve audience participation include polling activities, cheering activities, doing the wave, and other types of actives as appropriate for the event or venue. Both in venue and remote users may participate in real time polling such as voting for a favorite player, predicting the outcome of game, predicting a final score, and the like. Polling questions and results may be displayed on the jumbo screen (204), the interactive DEP (700), or both. Real time polling and other types of audience participation events may be on an individual basis or a group basis. Referring to FIG. 2, the platform (20) may take individual polling responses in each section, 222, 224, 226, determine the answer with the highest frequency, and assign that answer/response to the section as a whole. In this way, polling activities may be based on a grouping of tags (16a, 16b) instead of individual tags (16a, 16b). Group polling activities are not limited to averaging or the like; they may occur via alternative mechanisms.

Of course, such polling is not limited to sporting events; any event or venue may offer real time participation activities that appeal to their particular audiences. For example, the city zoo may have a "vote now" (728) or other adaptation of an audience participation feature. Since zoo visitors are typically widely dispersed, results of polling may be tallied at the end of a predetermined time and sent to the user device (14a, 14b)

UPCOMING EVENTS: Many event programs include a listing of events that are scheduled for a given time (e.g., season, year, month, etc.). Traditional paper programs typically only included a list of events to be held at a particular venue (202), although sometimes they may list events to be held nearby such as within the same city or other geographical area. Thus, a listing of upcoming events tends to be thought of as static list. But many events may be inserted into a schedule, rescheduled, canceled and the like. Thus, without the ability to update a listing of upcoming events the list may be incomplete and/or incorrect when distributed in a static program.

The upcoming events feature/module (620, 708) of an interactive DEP is dynamic at least by being able to reflect changes to event line ups as they are noted in a data source from which the list draws information. Moreover, the interactive DEP as described herein may customize a listing of upcoming events for a particular user. For example, the unique ID and data aggregated therewith may give insights into what type of events a particular user enjoys. If the user has a high number of tags (16a) scanned at venues relating to performing arts, historic buildings, museums, or the like the user may receive a listing of upcoming events that weighs heavier on these types of events even though the user is presently at a sporting event and looking at the corresponding sporting event interactive DEP. As another example, the platform (20) may use the unique ID to determine where the user is primarily located geographically so that if the user scans a tag (16a, 16b) outside of his/her primary geographic location the platform (20) may use the unique ID, associated data, and other data to provide a customized list for the user's current geographical location that corresponds to the time that the user is estimated to be away from his/her primary geographical location, a customized list for the user's primary geographical location and after the user is estimated to return, or both. And if the platform (20) determines that the user who scanned a tag (16a) such as for a sports team that is not at the sports team's home arena, the user may be able to select between an interactive DEP for the home team or for the away team. In this way, the user may be able to keep up with information relating to his team of preference. In other situations, a listing of upcoming events may relate to locations where the team, company, troupe, or the like is next appearing. In some cases, the user may be able to use the interactive DEP (e.g., other [626]) to link to a third party ticketing broker via a third party integration (320) to purchase tickets at the out-of-town venue.

The interactive DEP provided by the city zoo includes a special days/daily special feature/module (708). This is essentially the same as upcoming events (620) described above. The daily specials, however, may provide dynamic content such as a video, an article, or other updatable element to inform users about a unique activity happening at the zoo that day such as a special exhibit, NFT raffle, face painting, as just a few examples. Special days may relate to upcoming holidays, days with a special theme or activity, extended or reduced hours, fundraisers, or any other special day. These types of interactive DEP elements may only be updated every so often, but the fact remains that they are still dynamic. The proprietor does not have to print a new list if something changes—it is a simple update of data that will automatically bring the new listing to users via the interactive DEP. The zoo too can provide a customized list of upcoming events as was detailed above with respect to the game day program (600).

CONTACTLESS TRANSACTIONS: Users, whether at the event or remote, may take advantage of one or more interactive DEP features/modules that enable contactless transactions such as ordering food (624, 734), merchandise (622, 736), tickets (e.g., other [626, 732]), or the like. While at a venue (202) the platform (20) knows which tag (16a) was scanned by the user device (14a) via the tag ID. Thus, the in-venue vendor may deliver the purchase to the user at the location identified by the tag (16a), such as the user's seat or another location specified by the user when the order was placed. Alternatively, the user may opt to pick up his/her purchase at the vendor location after placing the order, receiving a notice that the order is ready, or other such messaging/notification.

Remote users may still be able to take advantage of contactless transactions via the interactive DEP. For example, a remote user may be able to connect to participating local eateries to have food delivered. The platform (20) may use a data associated with the users device (14b) including data associated with the unique ID assigned to that remote user device (14b) to determine the user's primary location or exact location (e.g., GPS), use third party integrations (320) to access participating vendors in the remote user's geolocation, and allow the user to place a food or other order to be delivered to the user's location. Similarly, remote users may also make in-venue purchases for merchandise (622) or other non-perishables that can be delivered to an address provided by the remote user via the interactive DEP, connect to in-venue or third party ticket providers to purchase ticket for one or more upcoming events or other similar transactions.

In-venue retailers may be able to take particular advantage of the interactive DEP. For example, digital offers can be sent to user devices (14a, 14b) via the game day program (600, 700). They can be directly loaded into the user's wallet (24a, 24b)) or appear in a popup window or a placeholder within the interactive DEP for dynamic content such as in-venue retailer offers or the like so that the user can tap on the offer before it is downloaded to his/her digital wallet (24a, 24b). In this way, the user may redeem the digital offer when making a contactless transaction via the interactive DEP, although the digital offer may not be limited to contactless transactions. This provides concession owners, retail owners, and advertisers an ability to immediately see conversion rate of a digital offer that is issued (e.g., 100 coupons were downloaded via an interactive DEP and 80 were redeemed).

Digital offers may also interface with surplus inventory at the venue. For example, if the concession stand has a surplus of hotdogs, the customized offer could BOGO hotdogs. Such information can be encoded through a third party integration (320) that generates and automates this information. For example, the total inventory of food or beverages may be displayed to an in-venue user or can be accessible to a manager of the concessions so as to effectively manage the operations for the venue.

Additionally, the merchandise portion of the interactive DEP may be linked, via a third party integration (320) to the POS to the team store. This would allow for dynamic pricing of merchandise based on information from the POS. For example, if there is an overstock of merchandise for a particular player, or other merchandise if at the city zoo for example, the platform (20) may generate a digital offer for a discount to purchase merchandise. Alternatively, if a player, zoo animal, or the like celebrated a milestone, such as player scoring his 10,000th point, a zoo animal being the first of its kind to be born in captivity, or other such milestone, a dynamic digital offer in the interactive DEP may change to advertise the discounted merchandise.

Mobile payment is a rapidly expanding business segment and NFC applications such as, for example, contactless transactions are expected to be the most widely adopted form of mobile payments. Embodiments of the invention provide users with the ability to establish radio communication (e.g., NFC) or other communication between the user device (14a, 14b) and the plurality of tags (16a, 16b) by touching them together or bringing them into close proximity. In this way, payment information may be automatically transferred from a secure location (e.g., digital wallet [24a, 24b]) to the platform (20) to complete the contactless transaction.

ADVERTISING AND DIGITAL OFFERS: Advertising and digital offers (e.g., at 724) may also be a form of dynamic content contained in an interactive DEP. Advertising and digital offers may be distributed throughout the interactive DEP, contained on one or more dedicated pages or both. Further, advertising and/or digital offers may be unlocked, released, ungrayed, or the like per one or more rules having one or more metrics/triggers associated therewith as is described with respect to FIG. 5. Digital offers may be loaded directly into a digital wallet (24a, 24b) or may be tapped to be downloaded to a digital wallet (24a, 24b). For those users who desire to keep receiving information, digital offers, and the like outside of the interactive DEP, the user may download "VIP Card" or the like to their digital wallet (24a, 24b). The proprietor, advertisers, sponsors, or the like may then use the VIP Card to send notifications to the user about venue/event promotions, updates, or any other information to the user device (14a, 14b). Thus, there is ample opportunity to be creative when it comes to digital offers.

Advertising, digital offers, and the like may be changed within the interactive DEP on a regular basis such as via a designated time slot, in a cycle, or other timing-based basis; based on a trigger/metric defined by a rule, whether the digital offer is shared, based on in-venue inventory levels, or other metrics, triggers, or circumstances. Some of these dynamic alterations have already been discussed with respect to another feature/module such as dynamic pricing of in-venue concessions, merchandise, or the like.

For example, an interactive DEP obtained by scanning an in-venue tag (16a) may include an advertising space (e.g., in only in-venue versions of the interactive DEP) linked to a specific in-venue retailer. That retailer could promote its business in real time offering distinct discounts at different times during the event, upon the occurrence of a metric, trigger, other condition, or another defined parameter. That the advertising, offers, and the like are only going to in-venue users may be controlled by the tag ID (e.g., for an in-venue point of interest), a geofence (316) around the event/venue, GPS coordinates from the user device (14a), time data (318), or combinations thereof.

In some instances where a user has a digital offer downloaded to the user device (14a, 14b), the user may transfer the digital offer to one or more other user devices. If the user transfers the digital offer to a predefined number of other user devices, the digital offer may increase. For example, upon opening the interactive DEP the individual may select individual a digital offer and download it to her/his device (14a, 14b). The digital offer may be linked to the unique ID for the device (14a, 14b), a unique certificate, or the like to track sharing. If the user transfers the digital offer to, for example, five other devices within a fixed time period such as, for example, a week, the digital offer automatically upgrades so that when the user goes to redeem the offer, the offer has been increased from 10% to 20% off. This capability offers further incentives for users to transfer their digital offers to family and friends so that they will receive greater discounts. Also, this capability will allow brands and retailers to watch their promotion go viral from a first point of download (e.g., via the interactive DEP) to various locations where the digital offers are transferred between various user devices. Some digital offers may be shared and tracked via NFC, MMS, SMS, social media such as Facebook, Twitter, Snapchat, etc. As a variation, digital offers may be browser based, stored in a digital wallet (24a, 24b), or both.

As has been detailed with respect to FIG. 5, a digital offer, advertisement, or other dynamic content may be made available to users based upon the fulfillment of one or more metrics/triggers or other condition to satisfy a rule. For example, a rule may be written to allow dynamic content to be released at or near the end of the event, if a particular team wins at a sporting event, if one or both teams at a sporting event scored a predetermined number of points, if a particular metric, trigger, or the like occurred such as a touchdown, a homerun, a stolen base, a 3-point shot, etc., or any other conceivable metric, trigger, condition or the like, or combinations thereof. In a specific implementation, a rule or other instructions may be written so that a third party advertising integration (320) may check on another third party integration (320) such as statistics, to see if a metric, trigger, condition, or the like has occurred (e.g., the quarter back threw a record number of touchdown passes), which would then release the digital offer for user consumption.

As with other forms of dynamic content, advertising, digital offers, and the like in the interactive DEP may also be customized in a manner that is the same as or similar to customization described with respect to FIG. 5. For example, conditions, triggers, metrics, or the like may be used to generate specific and tailored information, offers, and content based upon the particular user information and actions of the user that may be associated with the unique ID. As one nonlimiting example, the unique ID may be used to determine the type of content that the user typically views on the user device (14a, 14b) and display an advertisement, digital offer, or the like based on that user's unique history. Additionally, advertisers, sponsors, or the like may want their content to only be displayed in the interactive DEP to users who fit their demographic profile. As such, unique IDs may be used together with other available information to deliver the designated content to just those users. Alternatively, user demographics may be assumed based on where the user is sitting or otherwise located at an event. In this way, advertisements, offers, and other content relating to luxury items may be distributed to only those users who purchased seats that are indicative of the ability to purchase such luxury items. As yet another example, different versions of an interactive DEP may receive exclusive content, digital offers, advertisements, etc., based on the perceived preferences for users sitting in those seats. It may be perceived that younger users will sit in discounted areas of a stadium, buy cheaper tickets to concerts, or the like and as such, advertisements, offers, and other content may be included in the interactive DEP version for such a grouping. At the other extreme, it may be believed that only those users with large disposable incomes will spend the money for expensive seats, locations, or the like and so content, including advertisements, digital offers and the like for high-end items may be included in the version of the interactive DEP to be distributed to that grouping. In this way certain exclusive content may be offered to different versions of an interactive DEP. Of course, content, advertisements, and the like may in some instances be customized based on information associated with a unique ID. For example, a young person may be extremely wealthy, but likes to sit in discount seats. Thus, the interactive DEP distributed to that user device may be a version that is the same as or similar to one to be distributed to expensive seats.

Since advertising space in an interactive DEP may be limited, it may be more valuable. Thus, advertising, offers, and other purchased content time/space may be priced accordingly. For example, advertising to be distributed to a grouping including expensive tickets for the event may cost more than to a grouping including cheaper tickets. Additionally, pricing for an event that is more exclusive may also cost more to the advertiser, sponsor, or the like. Thus, the cost to advertise in a particular version or all versions of an interactive DEP may also be dynamic. To offset costs, in an embodiment, advertising space and the like may be sold on a "pay per click" basis, such as by the number of tags (16a, 16b) were scanned at a particular event, on a particular day, in a given time frame or the like, by the number of digital offers that were downloaded, by the number of digital offers that were used, or any other trackable pricing scheme. Advertising space may also be sold on a tiered basis. For example, advertising on a home page, or top features/modules viewed may have one cost level, which decreases as the determined usage of the feature/module decreases. Also, advertising, digital offers, and the like may be dynamically moved during the event if the feature, module, page, etc. that receives the most usage during a particular event is different than what is expected. As one example, an advertiser may pay for a space on the first page seen for an interactive DEP, but a replay of some exciting action is being viewed by most of the users and they are skipping over the first page. An administrator may be able to move the content to the page that is in actual use or it may happen automatically, thereby ensuring that the paid for content is in fact being displayed per the purchase plan, price, etc.

Eventually the event will end, even if it a daily event such as a zoo, museum, or the like. In some embodiments, connection to the interactive DEP is also cut off. Thus, although the user may still be able to see a cached copy of the interactive DEP, nothing in copy will be updated, altered, modified or the like. Alternatively, the interactive DEP may continue to be used use by the user. As one example, the proprietor may opt to have the interactive DEP maintained by the platform (20), and as such it may function much like a traditional web site, but one that is only available to users who have previously scanned a tag (16a, 16b) for the interactive DEP during the event. In this way, proprietors may stay in communication with its customers (i.e., event users, remote users) an updated the interactive DEP latest content, offers, etc. on an ongoing basis. In fact, in some instances, the proprietor may keep one or more "expired" (i.e., for an event that is over) interactive DEPs as a historic document such as for a season, keeping certain content, offers, etc. static while providing new dynamic content. For example, a historic version of an interactive DEP may provide recaps (video, images, text) of the event or related sequence of events (e.g., over a sports season), change or reup digital offers, keep certain digital offers open for subsequent use, among other possibilities. Keeping a historic document will not interfere with a user being able to scan the same tag (16a) at the venue to receive the latest interactive DEP as each DEP has a different URL, ID, etc. and the latest tag (16a) scan will lead the user device (14a) to the correct interactive DEP for the current event in progress.

PROPRIETOR ADMINISTRATIVE OR OTHER ADMINISTRATIVE ACTIVITIES: Proprietors may manage their network of tags (16a, 16b) using the proprietor portal (FIG. 3, [322]). In an embodiment, proprietor portal (322) is software suite running on platform (20). The proprietor may access the portal (322) via a Web browser, other application, or both executing on the administrator device (FIG. 1, [12]). The interface for the proprietor portal may be one or more browser-based Web pages, a Web-based application, a progressive Web application, a downloadable application, a native application, and a cloud-based application (to name just a few examples), which may be delivered to the administrator device (12) by the redirect/identification server (302). Thus, the proprietor may be able to view and manage various aspects associated with the proprietor's venue, event, network, etc. including viewing the real-time status of all tags (16a, 16b), interactive DEP templates, URLs, content, and more.

Indeed, much of the platform (20) may be accessible to the proprietor such as the database (308) to manage data relate to tags (16a, 16b), interactive DEP templates, content, unique IDs, data verified using verification techniques/algorithms, data verified as part of a blockchain distributed ledger, other data stored thereon, and combinations thereof. In an embodiment, the analytics server (312) may retain device (14a, 14b) requests and/or data from past user interactions with one or more tags (16a, 16b), including interactions assigned to individual user devices (14a, 14b) and/or collective interactions of some or all user devices (14a, 14b). The analytics server (312) may also incorporate third party data from outside sources third party integrations (320), blockchains (314), and others. Thus, the analytics server (312) may run software to analyze collected data from some or all of the forgoing to help optimize what a particular user experiences through his/her interactive DEP. As nonlimiting examples, analytics server (312) may use information from cookies, log files, page tags (e.g., JavaScript code embedded in Web pages), associated with a unique ID, and combinations thereof for reporting to the interface server (306), administrator server (310) or the like. Indeed, in an implementation, some or all of the administrative tasks may be performed by a platform (20) administrator via administrator server (310). As one nonlimiting example, a platform (20) administrator may be called upon to write rules for one or more versions of an interactive DEP, especially when the rule(s) need to be written in a specific coding language that the proprietor is not familiar with.

Typical administrative activities associated with a network of tags (16a, 16b) include those relating to tag (16a, 16b) management, creating, updating, managing interactive DEP templates, reporting, and more. The examples detailed herein are for illustrative purposes only and are not intended to limit how a proprietor may choose to view, manage, generate, store, or otherwise manipulate data. Additionally, it should be realized that the actual proprietor may not be performing administrative or other such tasks. Typically, these are handed off to agents, employees, or other representatives of the proprietor. In some circumstances, stadium officials may be able to access the proprietor portal (322)

from a handheld device such as a smartphone, tablet or the like so that they may perform certain tasks on the go.

Tag management may include tasks such as, without limitation, assigning each tag (16a, 16b) in a network to a distinct point of interest, creating tag groupings, assigning an employee to one or more tags or groups of tags, and additional tasks. Assigning each tag (16a, 16b) to a distinct point of interest includes linking the tag ID to the distinct point of interest so that when the tag (16a, 16b) is scanned by a user device (14a, 14b) the point of interest is known via the tag assigned thereto. To help ensure that tags, in particular in-venue tags (16a) have not been tampered with, the interactive DEP may include a reference to the point of interest it is associated with such as "This Game Day Program is for seat 1, row A, section 100" or something similar thereto. If tampering is a problem, the user may even be required to confirm that the tag (16a) scanned corresponds to the seat or other point of interest before the interactive DEP is displayed on the user device (14a).

The proprietor may also group tags (16a, 16b) via the proprietor portal (322). Tag (16a, 16b) grouping is flexible to meet the needs of the proprietor at any time. Thus, tags (16a, 16b) may be grouped, regrouped, sub-grouped, etc. on demand. Grouping tags (16a, 16b) may be advantageous for many reasons. As one nonlimiting example, tags (16a, 16b) may be grouped to deliver different versions of interactive DEPs to different users such as those in the venue, remote from the venue, and other such grouping which have been detailed herein. Although grouping tags (16a, 16b) enables certain activities to belong to the grouping such as content pushed or the like, each tag (16a, 16b) remains autonomous e.g., the platform (20) still knows which particular tag (16a, 16b) was scanned by a user device (14a, 14b) and it knows to which group the particular tag (16a, 16b) belongs.

It should be noted that scanning a tag (16a, 16b) does not always result in the loading of an interactive DEP on a user device. The proprietor can associate each tag ID with an endpoint outcome such changing certain phone settings, creating and sending a text, launching an application other than one associated with an interactive DEP, turning on device via Bluetooth or any number of commands to be executed, limited only by the communication device. Another endpoint outcome may be to redirect the user device (14a, 14b) to a Web page/Web site other than the interactive DEP such as one for a particular advertiser, sponsor, organization, or the like. This type of redirection may occur at different times during an event so that if a user scans a tag (16a, 16b) for the first time or if the user rescans the tag (16a, 16b) during the event, the user device (14a, 14b) will be redirected to the advertiser, et. al.'s page instead of the interactive DEP. In this way, multiple different advertisers can utilize the plurality of tags (16a, 16b) during the event.

Of course, the endpoint outcome may also be loading a version of the interactive DEP on the user device (14a, 14b). In an embodiment, the proprietor may log in to the proprietor portal (322) to access one or more Web-based templates for a given interactive DEP. Generally, the proprietor may choose a format (e.g., like the game day program [66] or the book-like program [700]) and drag and drop placeholders for features, elements, content, etc. in the template to correspond with a desired visual layout. For instance, placeholder for an article may be dragged and dropped on a particular page and in a particular location on the page. Other placeholders for surrounding content such as images, video, advertising, etc. may also be dragged and dropped as desired. This flexible approach may be handled in-house, which also enables the proprietor to alter the template at any time, even during the event. Further, it is easy to create versions of the interactive DEP from such a backend template driven approach. That is, the same basic layout may be used for several different versions of the interactive DEP for the same event. The proprietor may assign different content to go with the different versions and make other tweaks to a particular version of the interactive DEP. Of course, the proprietor may always create a completely different format, layout, or both for a version of the interactive DEP.

Assigning different content to different placeholders may be as simple as causing the placeholder in one version to be linked to one advertisement, image, NFT, or the like, and the placeholder in a second version of the interactive DEP to be linked to a second advertisement, image, NFT, or the like. As one nonlimiting example, a link to content may be via a URI such as a URL. Moreover, if the content is dynamic content the link may lead to a third party integration (320), which may utilize one or more APIs, although embodiments are not so limited. Thus, content may continuously be delivered to the interactive DEP via the third party integration. As one example, a template placeholder for statistics may be substituted with statistics content in the interactive DEP that is continuously updated, but a third party integration for a journal article may be substituted for its placeholder only one time without additional updates, as is the general nature for journal articles. Actual content inserted into the interactive DEP in lieu of a placeholder may be governed by a rule having one or more metric, triggers, or the like. Savvy proprietors may be able to write their own rules and cause them to accurately function within the interactive DEP. Alternatively, an administrator for the platform (20) may assist with this or any other task. Rules may be written to allow certain content to become available when certain metrics, thresholds, triggers, etc. have been met. Such conditions may be simple, e.g., update every N second, or they may be very sophisticated and complex. Nevertheless, rules, metrics, triggers, thresholds, and other conditions may allow each interactive DEP distributed to users during an event to be highly customized for a particular user.

When a template, its content, rules, etc. are finished, or even before it is finished, the URL for the template may be assigned and attached to a venue (e.g., if the proprietor has several venues), an event, both, a group within the venue (202), a geographical location, a Web page (e.g., for the venue, event, both), a network, a regional network, or any other designation for accurate distribution. In this way, when a user device (14a, 14b) scans a tag (16a, 16b) the tag ID may be used to redirect the user device (14a, 14b) to the proper template for the interactive DEP for the particular event in which the user is engaged. Thereafter, placeholders may be populated with content for user consumption and dynamically updated such as by content updating instructions including one or more rules.

Thus, the use of a template allows for easy distribution and simple modification by proprietors. However, savvy users can modify and use their own forms or unique formatting as necessary for each instance other than rely on a platform (20) provided template. By utilizing simple formatting, such as in a template, information, including those being captured in a live format from a third party integration (320), can be added via "drag and drop" type creation, which allows for extremely simply modifications. For example, content can be created before an event and continually modified as an event unfolds. The interactive digital interactive program can be mobile first and contain various native features that allow for an engaging fan experience.

Proprietors have the ability to monitor their network of tags (16a, 16b) via the proprietor portal (322) viewing data in various graphic forms such as graphs, charts, diagrams, etc. The proprietor may monitor the status of points of interest (e.g., via the network of tags) in real time as the event is in progress. In this way, the proprietor may see how users interact with tags (16a, 16b) and can make any adjustments as the proprietor sees fit. During the course of monitoring, the proprietor may manually update content based on data collected, feedback received, and the like. If a change is made to a template while the event is in progress, the change is automatically applied to the interactive DEP on the user device (14a, 14b).

In an embodiment, a proprietor may want to receive feedback from users. User input may be a valuable source of information for a wide variety of purposes such as determining user satisfaction. According to embodiments of the invention, a feedback feature/module may be placed in the interactive DEP so that users can submit comments directly to the proprietor. Such feedback may be in the form of fillable fields, surveys, written comments, or combinations thereof.

A proprietor may also run reports utilizing the proprietor portal (322). For example, the proprietor may view information relating to overall usage statistics, group statistics, individual tag statistics, statistics about which features/modules are used the most, if they are used more on one page versus another page, and much more. In an embodiment, the proprietor may even be able to run a report on tag usage across several events, venues, or the like. Usage reports may be configured for information such as the number of times a given tag has been scanned by any user during a period of time (e.g., day, week, hour, etc.) or the number of times any tag has been scanned by a particular user during a period of time, or many other ways in which a proprietor may want to analyze the data.

Referring back to FIG. 3, the infrastructure detailed therein is exemplary, dividing processing between at least two servers (e.g., redirect/identification server and interface server [306]), but embodiments are not so limited. The numbers and types of servers and software may be scaled up, down, and distributed according to platform (20) demands/needs. Furthermore, more than one virtual machine may run on a single computer and a computer/virtual machine may run more than one type of server software (e.g., the software that performs a service, e.g., Web service, application service, and the like). Thus, in some instances platform (20) may include one computer for all processing demands, and in other instances platform (20) may include several, hundreds, or even more computers to meet processing demands. Additionally, hardware, software, and firmware may be included in or removed from platform (20) to increase functionality, storage, and the like as needed/desired.

Administrator device (12), which is shown in FIG. 1, may be any type of computer such as a laptop computer, desktop computer, tablet, and the like. Similarly, user device (14a or 14b) may be any type of processing device such as a handheld computer (e.g., phone, smartphone, tablet, personal digital assistant), wearable computer (e.g., watch, glasses), or portable computers (e.g., laptop, netbooks). Scanning of the tag (16a, 16b) from the user device (14a or 14b) is performed through near-field communication (NFC) or use of a camera on the user device (14a or 14b) to scan the visible quick response code (QR code). Administrator device (12) and user devices (14a or 14b) typically include a browser application to facilitate communications with one or more servers among other things.

Computer (12), user devices (14a, 14b), and servers (e.g., 302, 306, 310, 312, 320, 322, and 324) may each be a general-purpose computer. Thus, each computer includes the appropriate hardware, firmware, and software to enable the computer to function as intended and as needed to implement features detailed herein. For example, a general-purpose computer may include, without limitation, a chipset, processor, memory, storage, graphics subsystem, and applications. The chipset may provide communication among the processor, memory, storage, graphics subsystem, and applications. The processor may be any processing unit, processor, or instruction set computers or processors as is known in the art. For example, the processor may be an instruction set based computer or processor (e.g., x86 instruction set compatible processor), dual/multicore processors, dual/multicore mobile processors, or any other microprocessing or central processing unit (CPU) Likewise, the memory may be any suitable memory device such as Random Access Memory (RAM), Dynamic Random-Access memory (DRAM), or Static RAM (SRAM), without limitation. The processor together with at least the memory may implement system and application software including instructions, including methods, disclosed herein. Examples of suitable storage includes magnetic disk drives, optical disk drives, tape drives, an internal storage device, an attached storage device, flash memory, hard drives, and/or solid-state drives (SSD), although embodiments are not so limited.

In an embodiment, servers (e.g., 302, 306, 310, 312, 320, 322, an/or 324) may include database server functionality to manage database (308) or another database. Although not shown, infrastructure variations may allow for database (308) to have a dedicated database server machine. Database (308) and any other database may be any suitable database such as hierarchical, network, relational, object-oriented, multimodal, nonrelational, self-driving, intelligent, and/or cloud based to name a few examples. Although a single database (308) is shown in FIG. 3, in embodiments database (308) may comprise more than one database, the more than one database may be distributed across many locations, and data may be redundantly recorded in the more than one database. Furthermore, data may be stored in blocks that are part of a chronological blockchain (314) and may be dispersed across a decentralized distributed ledger. Blocks of data in a blockchain are linked in such a way that tampering with one block breaks the chain. Thus, digital data stored in a blockchain is verifiable with an elevated level of integrity. Therefore, the database (308) may also be a distributed database system, utilizing blockchain (e.g., 314) to provide for storage of NFTs or the like related to the system. As with any distributed database, the number of databases and particular nature of the blockchain storage is dependent on the particular exchange or blockchain utilized for the NFT as one nonlimiting example. The use of a distributed database system is well known and the storage of an NFT or the like requires the use of such systems. Geofence (316) and Time (318) may be software services provided by the platform (20). These services (316, 318) may be executed by any or all of the computing machines, virtual or otherwise, found on the platform (20). These services may use data from one or more user devices (14a, 14b) and other data sources to provide their intended functionality as is known in the art.

It will be appreciated that the embodiments and illustrations described herein are provided by way of example, and that the present invention is not limited to what has been particularly disclosed. Rather, the scope of the present invention includes both combinations and sub combinations of the various features described above, as well as variations and modifications thereof that would occur to persons skilled in the art upon reading the forgoing description and that are not disclosed in the prior art. Therefore, the various systems and methods may include one or all of the limitations of an embodiment, be performed in any order, or may combine limitations from different embodiments, as would be understood by those implementing the various methods and systems detailed herein.

What is claimed is:

1. A method for receiving an order from a user device via an interactive digital event program corresponding to an event comprising:
   a. receiving a request for an interactive digital event program from a user device, the request received in response to scanning, with the user device, a tag encoded with a tag identifier to identify a location corresponding to the tag;
   b. automatically determining, in response to receiving the request, the location corresponding to the tag that was scanned by the user device and also determining which, if any, ticketed entertainment-based event is in progress at a time the tag was scanned wherein determining the location and determining an event-in-progress are both implemented via a lookup of the tag identifier;
   c. providing the user device with the interactive digital event program for the ticketed entertainment-based event, the interactive digital event program including at least one dynamic content element that is capable of being updated through a call to and/or an update from a third party data source while the event is in progress; and
   d. receiving an order via a third party content element integrated in the interactive digital event program provided to the user device, the order to be delivered to or within the location corresponding to the tag that was scanned.

2. The method of claim 1 wherein updating the at least one dynamic content element includes updating dynamic content selected from the group consisting of: a map, a video replay, augmented reality, live action video, a fan camera, a fan filter, live statistics, a non-fungible token, wagering, an audience participation activity, upcoming events, merchandise, concessions, a digital offer, and a ticket.

3. The method of claim 2 wherein updating the at least one dynamic content element includes unlocking a digital offer in response to detecting the use of an in-venue map.

4. The method of claim 3 wherein updating the at least one dynamic content element includes disposing icons on an in-venue map corresponding to locations of one or more additional tags that are distributed within a venue in which the event is taking place.

5. The method of claim 4 further comprising facilitating a scavenger hunt within the venue utilizing the one or more additional tags.

6. The method of claim 2 wherein updating the at least one dynamic content element includes updating the dynamic content element to include a digital offer, the digital offer to be automatically downloaded to a digital wallet on the user device.

7. The method of claim 2 wherein updating the at least one dynamic content element includes updating the dynamic content element to include a video replay of action that took place during the event.

8. The method of claim 2 wherein updating dynamic content includes updating a digital offer based on current levels of inventory available at the event wherein inventory ordered is to be delivered to or within the location corresponding to the tag that was scanned.

9. The method of claim 1 further comprising linking the at least one dynamic content element to the third party integration, the at least one dynamic content element for a digital offer relating to purchases available via the third party integration, said linking occurring after the event has started.

10. The method of claim 1 wherein the at least one dynamic content element includes a digital offer and syncing the digital offer to advertising shown on a jumbo screen, a televised broadcast of the event, or both.

11. The method of claim 1 wherein the at least one dynamic content element includes statistical information, updating the statistical information in real time as the event is taking place, inserting a dynamic image element proximate to the statistical information to dynamically display an image corresponding to the statistical information, and linking the third party integration to the statistical information, the dynamic image element, or both.

12. The method of claim 1 wherein the tag is either at a venue in which the event is in progress at a time the tag was scanned or the tag is on or in a live or a recorded video stream of the event.

13. The method of claim 1 wherein providing the user device with the interactive digital event program comprises redirecting the user device to the interactive digital event program via a redirect uniform resource identifier (URI).

14. The method of claim 1 wherein determining which ticketed entertainment-based event is in progress further includes determining that a ticketed event is not in progress and directing a user device to a web page that is not an interactive digital event program.

15. A system for providing an interactive digital event program corresponding to a particular entertainment-based event comprising:
   a. a plurality of tags, each tag in the plurality having a machine-readable code and a unique tag identifier that identifies a location corresponding to the tag;
   b. a server having a computer processor and computer memory;
   c. a database operatively connected to the server, the database including information relating to each tag in the plurality of tags, the information relating to each tag including:
      i. the unique tag identifier and the location corresponding thereto;
      ii. a plurality of single-occurrence entertainment-based events, each event in the plurality taking place at a same venue but at a different time; and
      iii. for each of the plurality of events, a corresponding template for an interactive digital event program; and
   d. wherein the computer memory of the server stores executable code which when executed enables the server to perform a process comprising:
      i. in response to receiving a request from a user device that has scanned a tag, using the unique tag identifier from the scanned tag for identifying the location corresponding to the scanned tag and the particular event taking place at the time the tag was scanned;
      ii. determining which of the templates for the interactive digital event programs corresponds to the particular event taking place, the determined template populated with one or more dynamic content elements;
      iii. assigning a digital event program identifier to the determined template;

iv. sending the determined interactive digital event program to the user device that sent the request;

v. updating the content of at least one dynamic content element in response to detecting a predefined trigger based on activity within the event that optionally occurred during the event;

vi. receiving an order via the interactive digital event program, the order to be received at or within the identified location; and vii. tracking and storing the order and/or additional user interaction with the interactive digital event program in the database in association with the digital event program identifier.

16. The system of claim 15 wherein updating the content of the at least one dynamic content element includes pushing updated content from a third party data source to the at least one dynamic content element in response to detecting a predefined trigger.

17. The system of claim 15 wherein the content of the at least one dynamic content element is subject matter associated with a non-fungible token (NFT) and updating the content of at least one dynamic content element in response to detecting a predefined trigger includes unlocking the subject matter in response to detecting the predefined trigger to enable acquisition of the NFT.

18. The system of claim 15 wherein the user device comprises a unique ID wherein the unique ID defines an entry within the database and wherein the entry comprises information regarding actions of the unique ID; and aggregating the data regarding the unique ID.

19. The system of claim 18 wherein the system collects and aggregates analytical user data corresponding to said unique ID when said user device is interacting with the interactive digital event program.

20. The system of claim 15 wherein identifying the location corresponding to the tag scanned by the user device comprises, determining if the tag that was scanned is located within a venue, was transmitted digitally and outside a venue, or is on an identification card.

21. The system of claim 20 wherein if the location corresponding with the tag that was scanned is determined to be within the venue, determining a delineated physical location within the venue.

22. The system of claim 20 wherein if the location corresponding to the tag that was scanned is determined to be transmitted digitally and outside of the venue or on an identification card, determining a location of the user device using system information or third party information linked to a unique ID assigned to the user device, global positioning system information, or both.

23. A method for delivering an event-based interactive digital program to a user device comprising:

a. receiving a request from the user device, the request generated in response to scanning a machine-readable code with the user device wherein the machine-readable code transmits location information to the user device, the location information received with the request;

b. determining a known location of the scanned machine-readable code and a ticketed event taking place, if any, at the known location at a time of scanning;

c. based on the determined known location of the scanned machine-readable code, an event-based grouping to which the scanned machine-readable code has been assigned, and the time of scanning, providing an interactive digital program for the determined ticketed event to the user device wherein the interactive digital program is a Web-based application created for the event taking place; and d. receiving an order from the user device, the order received via the interactive digital program and to be delivered to the determined known location.

24. The method of claim 23 wherein the location information transmitted to the user device is a unique identifier, and wherein determining the known location of the scanned machine-readable code comprises using the unique identifier assigned to the scanned machine-readable code to query a database for the known location in which the scanned machine-readable code is installed, displayed, or printed.

25. The method of claim 24 wherein the known location in which the scanned machine-readable code is installed, displayed, or printed is selected from the group consisting of: a particular seat, a particular venue, a particular identification badge, a particular data stream, or a particular data transmission.

26. The method of claim 25 further comprising identifying a global positioning system location for the scanned machine-readable code.

27. The method of claim 23 further comprising determining if the user device has a unique identifier assigned thereto, and if not, assigning a unique identifier to the user device wherein data relating to the user device is stored in association with the unique identifier assigned to the user device and the interactive digital program provided to the user device is customized based on stored data relating to the user device.

28. The method of claim 23 wherein determining the known location of the scanned machine-readable code comprises determining a venue location.

29. The method of claim 28 wherein the venue location is selected from the group consisting of: a stadium, a sports venue, an entertainment venue, a museum, a zoo, a campus, a school, a vehicle, and a hotel.

30. The method of claim 23 wherein receiving the order comprises receiving an order for food, merchandise, or both.

31. The method of claim 23 wherein the location information encoded on the scanned machine-readable code is appended to a uniform resource locater that defines a route in which the request is made.

32. The method of claim 23 wherein the interactive digital event program for the determined ticketed event taking place is a progressive Web application embedded in at least one Web page.

* * * * *